US010670687B2

(12) United States Patent
Mateti et al.

(10) Patent No.: US 10,670,687 B2
(45) Date of Patent: Jun. 2, 2020

(54) VISUAL AUGMENTATION SYSTEM EFFECTIVENESS MEASUREMENT APPARATUS AND METHODS

(71) Applicant: The United States of America as represented by the Secretary of the Navy, Crane, IN (US)

(72) Inventors: Kiron Mateti, Bloomington, IN (US); Aaron Cole, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 568 days.

(21) Appl. No.: 15/624,113

(22) Filed: Jun. 15, 2017

(65) Prior Publication Data

US 2017/0363707 A1    Dec. 21, 2017

Related U.S. Application Data

(60) Provisional application No. 62/350,360, filed on Jun. 15, 2016.

(51) Int. Cl.
*G01S 3/78* (2006.01)
*F41G 1/35* (2006.01)
(Continued)

(52) U.S. Cl.
CPC .............. *G01S 3/7803* (2013.01); *F41G 1/35* (2013.01); *G01S 3/785* (2013.01); *G01S 3/786* (2013.01);
(Continued)

(58) Field of Classification Search
CPC .......... G01S 3/7803; G01S 3/78; G01S 3/781; G01S 3/782; G01S 3/785; G01S 3/786; G06T 7/246; G06T 19/006; G06T 2207/30204; G06T 2207/30212; G02B 23/125; G02B 23/12; G02B 27/0093; F41G 1/35; F41G 1/36; F41G 1/34; F41G 1/32; F41G 1/38; F41G 1/26; F41G 3/26; F41G 3/2616; F41G 3/2622; F41G 3/2655; F41G 3/2661; F41A 33/02; G09B 9/003

See application file for complete search history.

(56) References Cited

U.S. PATENT DOCUMENTS 4,463,252 A    7/1984 Brennan et al.
4,640,514 A    2/1987 Myllyla et al.
(Continued)

OTHER PUBLICATIONS

Johnson, Chris, "The Role of Night Vision Equipment in Military Incidents and Accidents", Oct. 21, 2015, Dept. of Computing Science, University of Glascow, accessed on Oct. 22, 2015 at http://www.dcs.gla.ac.uk/~johnson/papers/night_accidents.pdf; 22 pages.
(Continued)

*Primary Examiner* — John R Lee
(74) *Attorney, Agent, or Firm* — Naval Surface Warfare Center, Crane Division

(57) ABSTRACT

Apparatus and related methods are provided for evaluating effectiveness of a visual augmentation system (VAS), such as night vision goggles (NVGs). The apparatus and methods illustratively measure the response time of the visual augmentation system (VAS) as a function of targeting detection, engagement, and scan angle.

41 Claims, 30 Drawing Sheets

(51) Int. Cl.

| | | |
|---|---|---|
| *G01S 3/786* | (2006.01) | |
| *G02B 23/12* | (2006.01) | |
| *G02B 27/00* | (2006.01) | |
| *G06T 19/00* | (2011.01) | |
| *G06T 7/246* | (2017.01) | |
| *G01S 3/785* | (2006.01) | |
| *F41A 33/02* | (2006.01) | |

(52) U.S. Cl.
CPC ....... *G02B 23/125* (2013.01); *G02B 27/0093* (2013.01); *G06T 7/246* (2017.01); *G06T 19/006* (2013.01); *F41A 33/02* (2013.01); *G06T 2207/30204* (2013.01)

(56) References Cited

U.S. PATENT DOCUMENTS

| | | |
|---|---|---|
| 5,567,937 A | 10/1996 | Pinkus |
| 5,852,291 A | 12/1998 | Thomas |
| 6,088,165 A | 7/2000 | Janeczko et al. |
| 6,195,206 B1 | 2/2001 | Yona et al. |
| 6,575,753 B2 | 6/2003 | Rosa et al. |
| 6,762,884 B2 | 7/2004 | Beystrum et al. |
| 7,211,778 B1 | 5/2007 | Smith et al. |
| 8,534,839 B2 | 9/2013 | Meuse et al. |
| 8,798,450 B2 | 8/2014 | Aicher et al. |
| 8,817,103 B2 | 8/2014 | Scales et al. |
| 8,844,896 B2 | 9/2014 | Pettersson |
| 9,341,837 B2 | 5/2016 | Li et al. |
| 2005/0153262 A1 | 7/2005 | Kendir |
| 2007/0008493 A1 | 1/2007 | Kratzer |
| 2008/0048931 A1 | 2/2008 | Ben-Ari |
| 2011/0261204 A1* | 10/2011 | Smith ..................... F41C 27/00 348/159 |
| 2015/0316761 A1 | 11/2015 | Williams |
| 2015/0338633 A1 | 11/2015 | Li et al. |
| 2016/0238352 A1* | 8/2016 | Baldridge ................ F41J 5/041 |
| 2017/0234650 A1* | 8/2017 | Houde-Walter .......... F41G 1/36 42/113 |
| 2017/0363707 A1* | 12/2017 | Mateti .................. G01S 3/7803 |

OTHER PUBLICATIONS

Pinkus, Alan et al., "Measuring Observers' Visual Acuity Through Night Vision Goggles", Aug. 23, 1998, Air Force Research Laboratory, Human Effectiveness Directorate, AFRL/HECV, accessed on Oct. 21, 2015 at http://www.researchgate.net/publication/235059817_Measuring_Observers'_Visual_Acuity_Through_Night_Vision_Goggles: 11 pages.

LaserLyte, "Trainer Score Tyme Target", Oct. 22, 2015, accessed on Oct. 22, 2015 at http://www.laserlyte.com/products/score-tyme-target; 2 pages, Raytheon Company, Raytheon Multi-Spectral Targeting Systems (MTS), @ 2015, retrieved from www.raytheon.com/media/sas/mts; 5 pages. (No month).

* cited by examiner

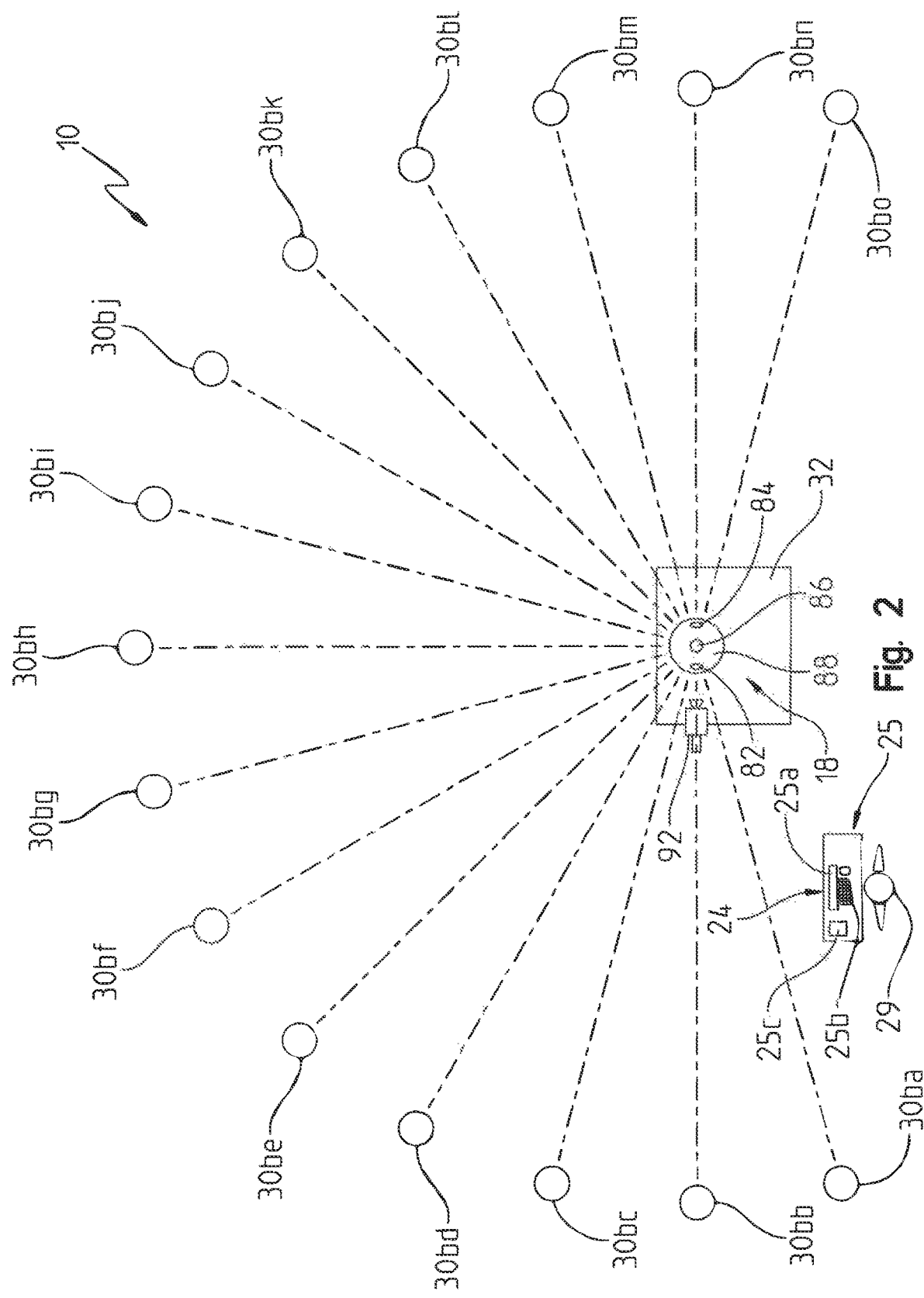

| TARGET LOCATION | TIME TARGET TRIGGERED | TIME TARGET HIT | HEAD ANGLE $\alpha$ | HEAD ANGLE $\beta$ |
|---|---|---|---|---|
| 2,4 | 14:00:32 | 14:00:38 | -60° | 0° |
| 3,5 | 14:00:56 | 14:01:04 | -45° | 15° |
| 1,7 | 14:01:24 | 14:01:28 | -15° | -15° |
| 4,6 | 14:01:40 | 14:01:46 | -30° | 30° |
| R,C | TA | TT | $\alpha$ | $\beta$ |

VISUAL AUGMENTATION SYSTEM EFFECTIVENESS MEASUREMENT APPARATUS AND METHODS

CROSS-REFERENCE TO RELATED APPLICATION

This patent application claims priority to U.S. Provisional Patent Application Ser. No. 62/350,360, filed Jun. 15, 2016, the disclosure of which is expressly incorporated herein by reference.

STATEMENT REGARDING FEDERALLY SPONSORED RESEARCH OR DEVELOPMENT

The invention described herein was made in the performance of official duties by one or more employees of the Department of the Navy and may be manufactured, used and licensed by or for the United States Government for any governmental purpose without payment of any royalties thereon. This invention (Navy Case 200,365) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE DISCLOSURE

The present disclosure relates generally to apparatuses and methods for evaluating visual augmentation systems (VAS). More particularly, the present disclosure relates to such apparatuses and methods for evaluating the utility and effectiveness of native unaided visual abilities of a user and/or a machine compared to that of such user and/or machine aided by a visual augmentation system.

For example, illustrative apparatuses and methods of the present disclosure measure and/or compare parameters of the unaided user/machine and/or the user/machine equipped with a visual augmentation system (VAS). Additionally, the illustrative apparatuses and methods of the present disclosure measure and/or compare parameters of the user/machine equipped with different visual augmentation systems (VAS) and associated configurations (e.g., mounts, environmental conditions (such as ambient light), etc.). Such parameters may include, for example, target detection time, target engagement response time, target discrimination, user target search and scan efficiency, target movement, clutter impact on the target parameters, clutter impact on user/machine engagement of the target, weapon discipline, tactical target training effectiveness, user/machine location, user/machine space management, user/machine movement, and predefined controlled target attributes which pertain to qualified and/or quantified measured parameters. Measurements collected are illustratively a function of time, rate, angle, spatial separation, spectral band, illumination intensity, accuracy, precision, and/or distractors, and may be interpreted as functions of VAS mount location, VAS mount mobility, and respective relationships with weapons and/or weapon systems. Measurements may be expressed in regard to scan efficiency, scan angle utilization, overall target detection, target discrimination, and/or target engagement efficiency.

Visual augmentation systems (VAS), such as gaming systems, augmented reality systems, night vision goggles (NVG), thermal imaging cameras, etc., are known in the art. For example, a conventional NVG enables users to detect, recognize and identify objects of interest or targets in a variety of spectrum (i.e., wavelength) and intensity lighting conditions, including very low light environments. The performance of these tasks, and burden on the user, is often dependent on various technical relationships between parameters that establish the overall quality of the NVG, which relate to various figures of merit (FOM) derived from technical aspects of hardware like image intensifier ($I^2$) tubes, optics, mounts, and bodies, and when combined, determine performance regulating parameters such as resolution, distortion, low light level sensitivity, field of view (FOV), weight, center of mass, etc.

The present disclosure provides an illustrative apparatus and system configured to quantitatively measure differences in effectiveness between a user/machine with unaided vision and those equipped with various visual augmentation systems (VAS) with varying performance capabilities, such as field of views (FOVs) and form factors. Assessments enable a user to understand the variations between systems in terms of user task performance and/or task fatigue. Towards this end, the illustrative system of the present disclosure measures the response time of an unaided user/machine with VAS aided user/machine to detect and engage active targets in spectrally managed and intensity controlled lighting environments (e.g., low light environments) as a function of angular distance between active targets, while recording user/machine movement (e.g., a user's head scan angle) required to detect active targets.

Conventional methods of evaluating visual augmentation systems (VAS) may include standard optical tests, such as optical characterization tests that evaluate the ability of a user to enable perception. One such test is a modulation transfer function (MTF) that results in detection, recognition, and identification of targets at select range values at various light levels. In particular, a modulation transfer function (MTF) of an NVG is a major characteristic that illustrates how well the device can reproduce the contrast of corresponding spatial frequencies within an observed scene. More particularly, MTF may predict the image quality of the $I^2$ tubes of the NVG. Exemplary data collected from conventional evaluation methods of visual augmentation systems (VAS), such as NVGs, do not effectively measure the variations in performance often related to the task of the user. On the other hand, performance evaluation methods using visual augmentation systems (VAS) typically provides data often of a more qualitative, and often subjective, nature.

In certain illustrative embodiments of the present disclosure, a system and related method are provided to quantitatively measure the response time of a warfighter in a simulated combat environment, as a function of target detection and head scan angle. Illustratively, at least one of a plurality of targets is illuminated when triggered by a controller, with at least one target having an address verified by the controller. A hand held light emitter, illustratively supported on a decoy weapon, is operated by the warfighter to direct a light beam toward the target. A detector on the target is triggered when hit by the light beam, which then sends a signal back to the controller. The controller records data (e.g., response time, head scan angle) and then illuminates at least one different target.

According to an illustrative embodiment of the present disclosure, a system for evaluating visual augmentation system effectiveness includes a visual augmentation system supported for movement by a rotatable support, the visual augmentation system configured to produce a visible image to a user in a plurality of selective spectrum and intensity lighting conditions, and a plurality of targets spaced apart from each other. Each of the plurality of targets includes a target radiation source configured to generate electromagnetic (EM) radiation visible to the user solely through the visual augmentation system, and a radiation detector for detecting an engagement signal, each of the targets having a unique target address. A user operated emitter is operably coupled to the rotatable support and is configured to emit the engagement signal, the engagement signal defined by a beam of electromagnetic (EM) radiation. A controller is in electrical communication with the plurality of targets, the controller including a library of the target addresses, an address control module configured to address one of the targets to define an addressed target, a trigger module to activate the target radiation source of the addressed target to define an illuminated target, and a data acquisition module defining a hit target when the radiation detector of the addressed target detects the beam of electromagnetic (EM) radiation from the user operated emitter and to provide a time stamp upon detecting the hit target.

According to another illustrative embodiment of the present disclosure, a system for evaluating visual augmentation system effectiveness includes a response time evaluation system and a head scan angle tracking system. The response time evaluation system includes a plurality of targets spaced apart from each other, each of the plurality of targets including a target radiation source visible to the user through the visual augmentation system, and a radiation detector, each of the targets having a unique target address. A user operated light emitter is configured to be held by the user and emit a beam of light. A controller is in electrical communication with the plurality of targets, the controller including a database of the target addresses, an address control module configured to address one of the targets and define an addressed target, a trigger module to activate the target radiation source of the addressed target and define an illuminated target, and a data acquisition module defining a hit target when the radiation detector of the addressed target detects the beam of light from the user operated light emitter and to provide a time stamp upon detecting the hit target. The head scan angle tracking system includes a head scan emitter supported by the head of the user, and a camera supported above the head scan emitter and track angular movement of the visual augmentation system.

According to a further illustrative embodiment of the present disclosure, a system for evaluating visual augmentation system effectiveness includes a visual augmentation system supported for movement by a rotatable support, the visual augmentation system configured to produce a visible image to a user in a plurality of selective spectrum and intensity lighting conditions, and a plurality of targets spaced apart from each other. Each of the plurality of targets includes a target radiation source configured to generate electromagnetic (EM) radiation visible to the user through the visual augmentation system, and a radiation detector for detecting an engagement signal, each of the targets having a unique target address. A user operated emitter is operably coupled to the rotatable support and is configured to emit the engagement signal, the engagement signal defined by a visible light beam configured to simulate a muzzle flash from a weapon. A controller is in electrical communication with the plurality of targets, the controller including a library of the target addresses, an address control module configured to address one of the targets to defined an addressed target, a trigger module configured to activate the target radiation source of the addressed target to define an illuminated target, the trigger module being further configured to control at least one of the wavelength, the intensity, and the divergence of the radiation emitted from the target radiation source, and a data acquisition module defining a hit target when the radiation detector of the addressed target detects the beam of light from the user operated emitter and to provide a time stamp upon detecting the hit target. A scan angle tracking system is in communication with the controller, the scan angle tracking system configured to track rotational movement of the visual augmentation system.

According to another illustrative embodiment of the present disclosure, a system for evaluating visual augmentation system effectiveness includes a visual augmentation system supported for movement by a rotatable support, the visual augmentation system configured to produce a visible image to a user in a plurality of selective spectrum and intensity lighting conditions. A plurality of targets are spaced apart from each other, each of the plurality of targets including a target radiation source configured to generate electromagnetic radiation visible to the user through the visual augmentation system, and a radiation detector for detecting an engagement signal, each of the targets having a unique target address. A user operated emitter is operably coupled to the rotatable support and is configured to emit the engagement signal, the engagement signal defined by a beam of electromagnetic radiation. A controller is in electrical communication with the plurality of targets, the controller including a library of the target addresses, an address control module configured to address one of the targets to define an addressed target, a trigger module to activate the target radiation source of the addressed target to define an active target, and a data acquisition module defining a hit target when the radiation detector of the addressed target detects the beam of radiation from the user operated emitter and to provide a time stamp upon detecting the hit target. A scan angle tracking system is in communication with the controller, the scan angle tracking system configured to track rotational movement of the visual augmentation system. The scan angle tracking system includes a scan emitter for emitting electromagnetic radiation and supported by the rotatable support to detect electromagnetic radiation from the head scan emitter and track angular movement of the visual augmentation system, a first camera supported vertically above the scan emitter for tracking angular movement of the scan emitter in a horizontal plane, and a second camera supported horizontally adjacent to the scan emitter for tracking angular movement of the scan emitter in a vertical plane.

According to yet another illustrative embodiment of the present disclosure, a method of evaluating visual augmentation system effectiveness includes the steps of supporting a visual augmentation system on a head of a user for producing a visible image to the user in reduced light conditions, and providing a plurality of targets spaced apart from each other, each of the plurality of targets including a target radiation source visible to the user through the visual augmentation system, and a radiation detector, each of the targets having a unique target address. The method further includes the steps of providing a user operated emitter, the user operated emitter configured to be held by the user and emit a beam of electromagnetic (EM) radiation, addressing one of the plurality of targets via the unique target address of the target, thereby defining an addressed target, activating the target radiation source of the addressed target, thereby defining an illuminated target, projecting the radiation beam from the user operated radiation emitter on the target, detecting through the radiation detector the radiation beam from the user operated radiation emitter, thereby defining a hit target, and providing a data acquisition module for recording a time upon detecting the hit target.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 2 is a top plan view of an illustrative row of targets of the visual augmentation system effectiveness measurement apparatus of FIG. 1A;

DETAILED DESCRIPTION OF THE DRAWINGS

Figure 1A:
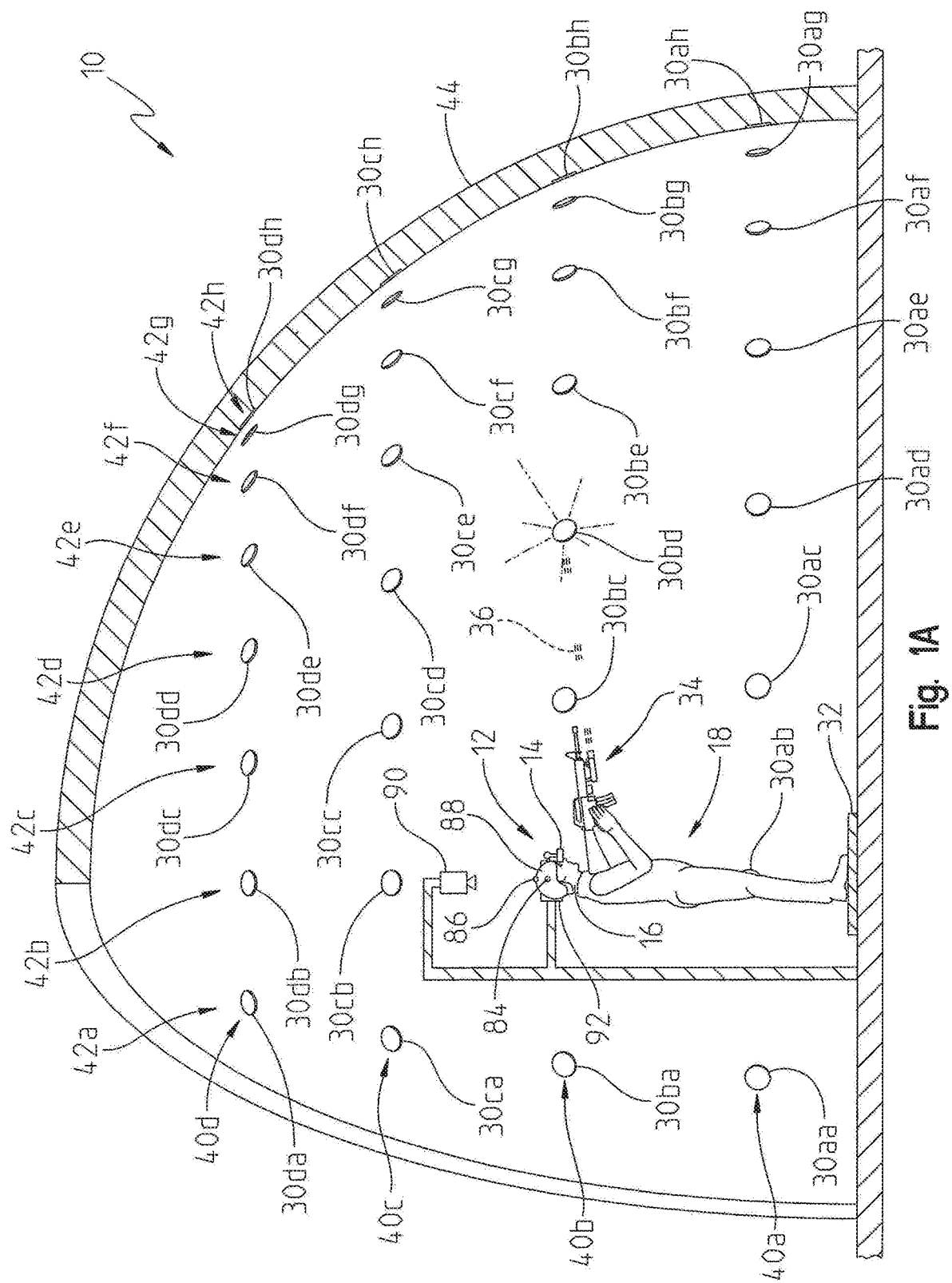
FIG. 1A is a partial perspective view of an illustrative embodiment visual augmentation system effectiveness measurement apparatus of the present disclosure for use with a visual augmentation system supported on the head of a user.

The embodiments of the invention described herein are not intended to be exhaustive or to limit the invention to precise forms disclosed. Rather, the embodiments selected for description have been chosen to enable one skilled in the art to practice the invention.

Referring initially to FIGS. 1A and 2-4, an illustrative embodiment visual augmentation system effectiveness measurement apparatus 10 is shown for use in connection with a visual augmentation system (VAS) or device 12. Visual augmentation systems 12 may include, for example, gaming systems, augmented reality systems, night vision goggles (NVG), thermal imaging cameras, etc., of the type known in the art. An illustrative visual augmentation system (VAS) 12 may comprise night vision goggles (NVGs) 14 that are supported on the head 16 of a user 18 for viewing therethrough. NVGs 14 enable a user 18, such as a warfighter, to detect, recognize and identify objects or targets in reduced or low light environments. As further detailed herein, FIG. 1B shows a further illustrative embodiment visual augmentation system effectiveness measurement apparatus 10' including a visual augmentation system 12' for use with a machine, such as an actuator driven positioning device 19.

One illustrative type of NVG 14 is an electro-optical device that is used to detect electromagnetic (EM) radiation, such as visible and/or infrared energy (e.g., light), and provide a visible image to the user 18. Such known NVGs 14 are typically based on common optical architecture (not shown), including an objective lens, image intensifier tubes ($I^2$), and an eyepiece lens. The objective lens focuses an image of the low light level scene onto the image intensifier tubes ($I^2$). The image intensifier tubes ($I^2$) amplify the faint image and presents an amplified image on its output surface. The eyepiece lens allows a human eye to view the amplified image.

NVGs 14 may include goggles, forward-looking infrared, thermal sights, and low-light level televisions/monitors. As used herein, NVGs 14 may also include devices configured to detect thermal infrared through thermal imaging.

One type of illustrative NVG 14 is model AN/PVS-7B/D available from NIVISYS. Illustrative NVGs are shown, for example, in U.S. Pat. No. 7,211,778 to Smith et al., U.S. Pat. No. 6,762,884 to Beystrum et al., U.S. Pat. No. 6,195,206 to Yona et al., U.S. Pat. No. 6,088,165 to Janeczko et al., U.S. Pat. No. 5,852,291 to Thomas, U.S. Pat. No. 4,463,252 to Brennan et al. and U.S. Patent Application Publication No. 2015/0338633 to Li et al., the disclosures of which are all expressly incorporated herein by reference.

Figure 3:
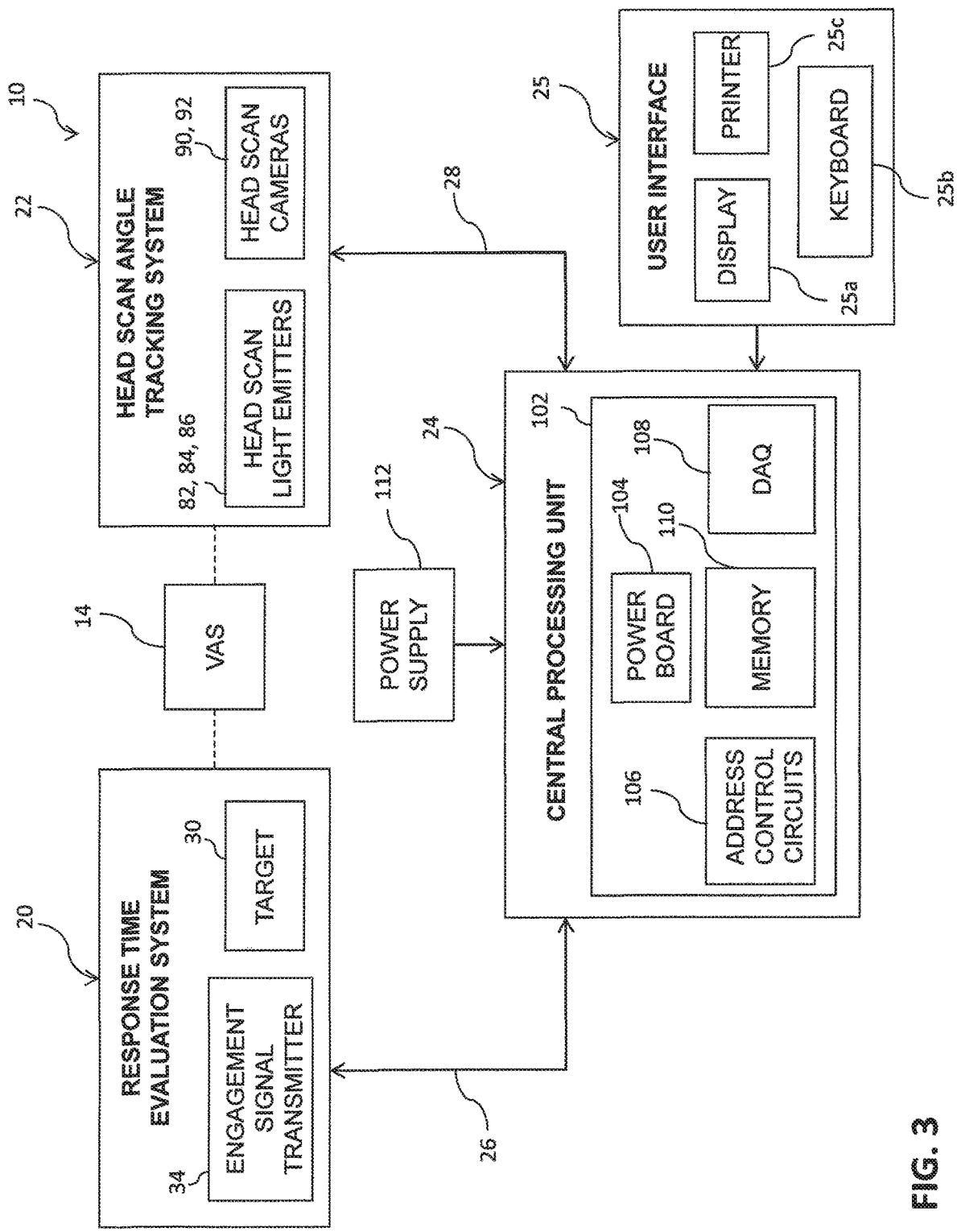
FIG. 3 is a diagrammatic view of the visual augmentation system effectiveness measurement apparatus of FIG. 1A, showing interaction between components of a response time evaluation system, a scan angle tracking system, and a central processing unit.

With further reference to FIG. 3, the illustrative visual augmentation system effectiveness measurement apparatus 10 includes a response time evaluation section or system 20 and a scan angle tracking section or system 22 configured to operate with the NVG 14. Both the response time evaluation system 20 and the scan angle tracking system 22 are operably coupled to a system controller, illustratively a central processing unit 24, through connection paths 26 and 28, respectively. The connection paths 26 and 28 may be provided through conventional wires or cables. Alternatively, the connection paths 26 and 28 may be wireless (e.g., via radio frequency (RF) communications). An operator 29 may interface with the central processing unit 24 through a conventional user interface 25, such as a computer terminal including, for example, a monitor or display 25a, a keyboard 25b and a printer 25c (FIG. 2).

Figure 1B:
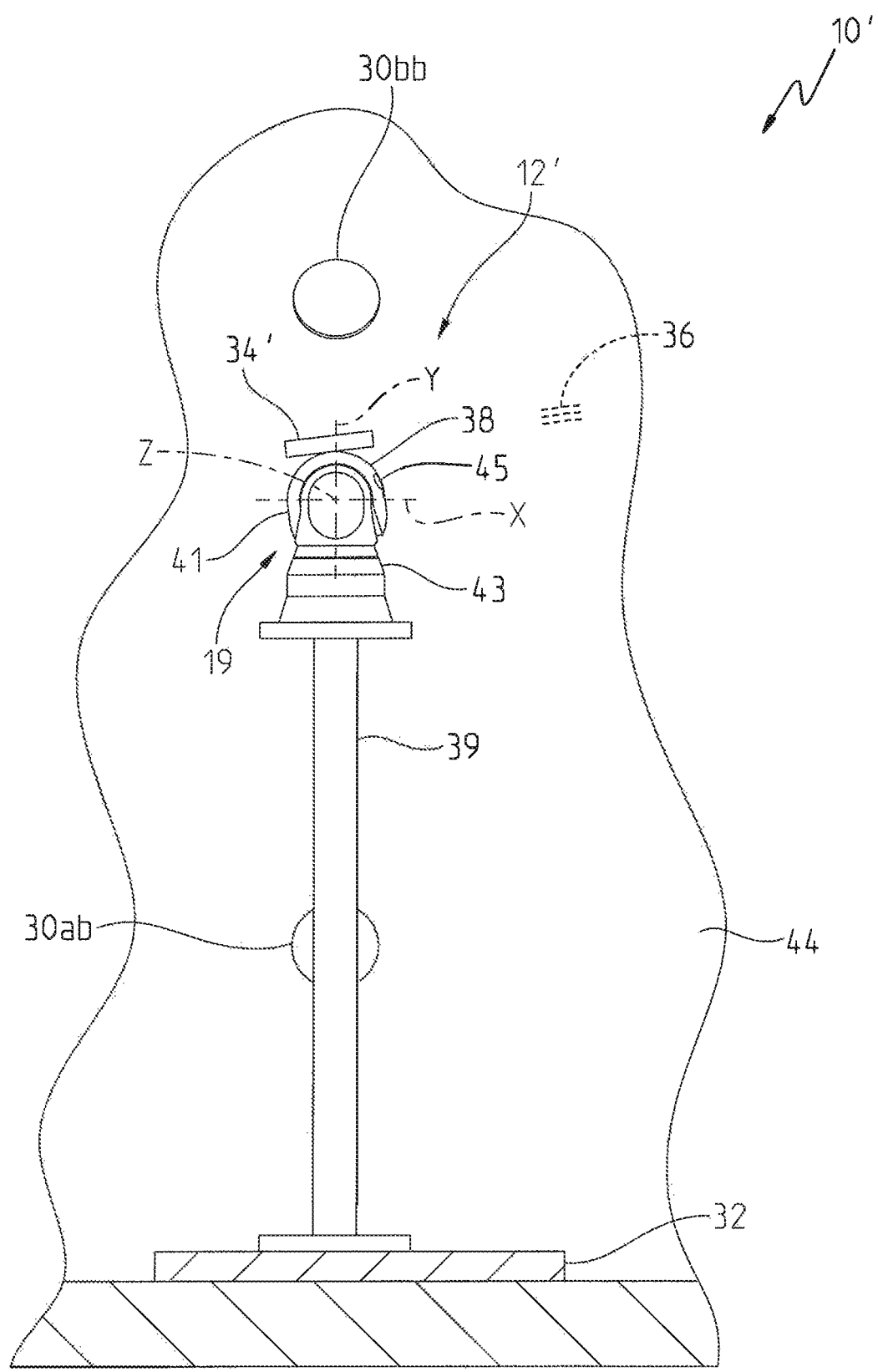
FIG. 1B is a partial perspective view of a further illustrative embodiment visual augmentation system effectiveness measurement apparatus of the present disclosure for use with a visual augmentation system supported on a machine, such as a positioning device.

The response time evaluation system 20 of FIGS. 1A and 2 illustratively includes a plurality of targets 30 positioned adjacent a user support or platform 32 on which the user 18 stands. An engagement signal source or user operated radiation emitter 34, illustratively a user operated illuminator (e.g., a light gun), is configured to be supported by the user 18 and to transmit an engagement signal, illustratively electromagnetic (EM) radiation in the form of a visible light beam 36, when triggered by the user 18. As further detailed herein, each target 30 is configured to detect the visible light beam 36 when in an active, or triggered state or condition.

The targets 30 may be spaced apart from each other in any one of a plurality of different selected geometries including, for example, an arc, a sphere, a linear and/or a polygonal shape. In the illustrative embodiment, the targets 30 are circumferentially spaced apart from each other in at least one arcuate, illustratively semi-circular, row 40. In an illustrative two dimensional (2D) configuration or array, a single row 40 is illustratively provided in an arc extending more than 180 degrees (illustratively, 210 degrees) around the user 18 supported on the platform 32. Each target 30 may be circumferentially spaced by approximately 15 degrees from each adjacent target 30 in a given row 40 (FIG. 2).

In an illustrative three dimensional (3D) configuration or array, a plurality of rows 40 are vertically spaced apart from each other to define a semi-spherical arrangement of targets 30. Again, each target 30 may be circumferentially spaced by approximately 15 degrees from each adjacent target 30 in a given column 42. In other words, the targets 30 in the 3D array are illustratively arranged in a plurality of vertically spaced rows 40 and circumferentially spaced columns 42. This semi-spherical arrangement of targets 30 may extend vertically above and/or below the user 18, and horizontally around the left and right sides of the user 18. In certain illustrative embodiments, a spherical or semi-spherical arrangement of targets 30 may substantially surround the user 18 supported on the elevated platform 32. A support structure, such as a shell 44 in the form of a dome, may support the targets 30 (FIG. 1).

Each individual target 30 is illustratively assigned a unique identifier or address. For example, each target 30 may include a two digit identification number, where a first number identifies a row (R) and a second number identifies a column (C). For example, and with respect to FIG. 1, in the first row 40a, target 30aa is assigned identifier (1, 1), target 30ab is assigned identifier (1, 2), target 30ac is assigned identifier (1, 3), etc. Similarly, in the second row 40b, target 30ba is assigned identifier (2, 1), target 30bb (not shown) is assigned identifier (2, 2), target 30bc is assigned identifier (2, 3), etc. In the third row 40c, target 30ca is assigned identifier (3,1), target 30cb is assigned identifier (3, 2), and target 30cc is assigned identifier (3, 3), etc., while in the fourth row 40d, target 30da is assigned identifier (4,1), target 30db is assigned identifier (4, 2), and target 30dc is assigned identifier (3,4), etc.

While the illustrative embodiment of FIGS. 1 and 2 disclose four (4) rows (R) 40 and fifteen (15) columns (C) 42 of targets 30, thereby totaling sixty (60) (N) targets 30, it should be appreciated that the number and placement of the targets 30 may vary. More particularly, spacing between the targets 30 may be increased or decreased to alter resolution of the response time evaluation system 20.

As shown in FIG. 1B, the illustrative visual augmentation system effectiveness measurement apparatus 10', instead of including a visual augmentation system 12 being supported on the head 16 of the user 18, a machine, such as the actuator driven positioning device 19, supports the visual augmentation system 12'. The actuator driven positioning device 19 may comprise a ball joint gimbal electro-optic system 38 supported by an elevated support 39 above the platform 32. More particularly, a ball 41 is illustratively supported by a gimbal 43 for rotation about multiple axes. Illustratively, the ball 41 may be rotated by the gimbal 43 about x, y, and z axes as shown in FIG. 1B. Night vision optics 45 are illustratively supported by the ball 41. A user operated emitter 34 is supported by the ball 41. As is known, the gimbal 43 may include a drive mechanism such as servo motors to drive the ball 41 in rotation. Position sensors, such as encoders, included within the servo motors may detect the relative position of the ball 41, and hence the emitter 43.

One type of illustrative visual augmentation system 12' and positioning device 19 is the Multi-Spectral Targeting System (MTS) available from Raytheon Company of Waltham, Mass. Additional illustrative systems are shown, for example, in U.S. Patent Application Publication No. 2015/0316761 to Williams, U.S. Pat. No. 8,844,896 to Pettersson, and U.S. Pat. No. 8,798,450 to Aicher et al., the disclosures of which are all expressly incorporated herein by reference.

Figure 4:
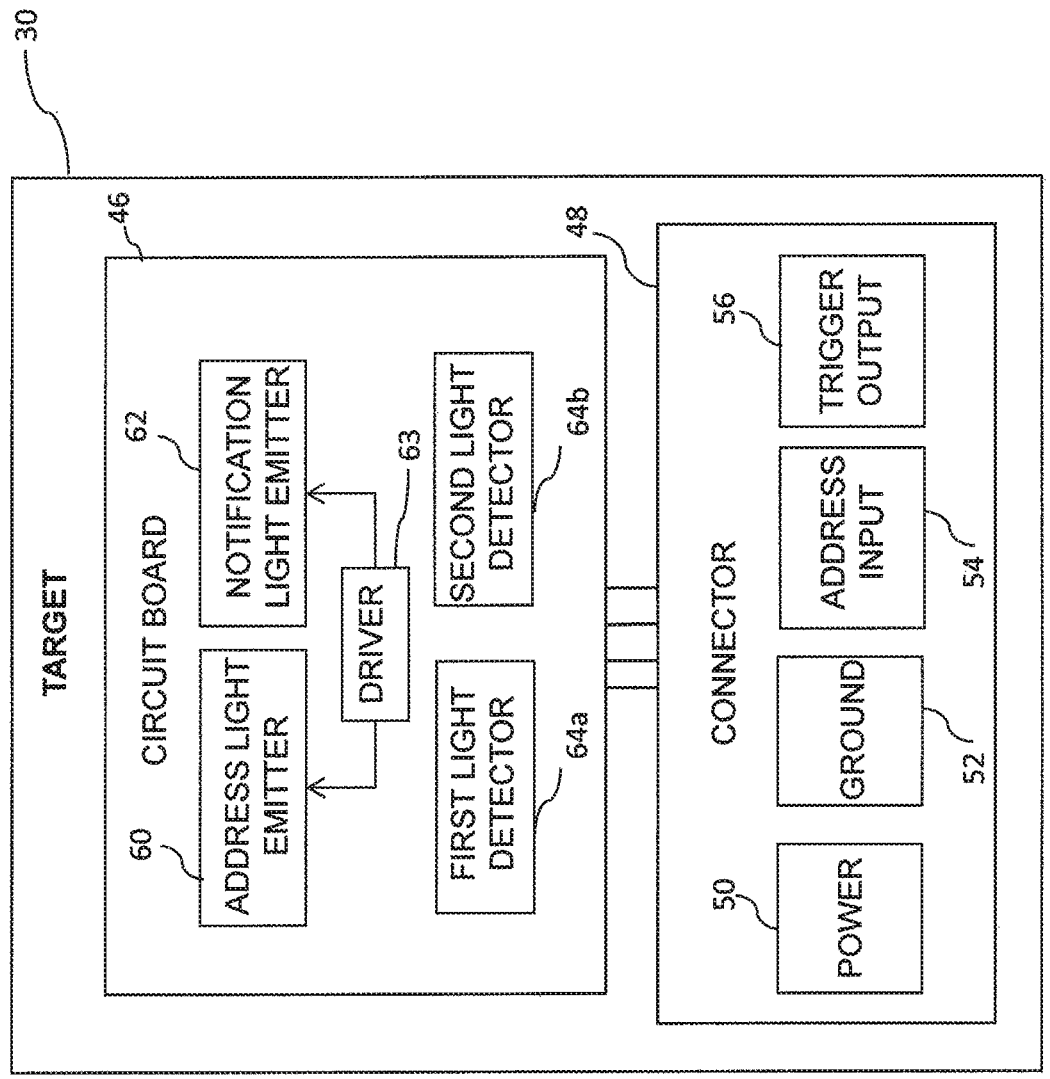
FIG. 4 is a diagrammatic view of a target of the response time evaluation system of FIG. 3.

FIG. 4 is a diagrammatic view of an illustrative target 30 of the visual augmentation system effectiveness measurement apparatus 10, wherein each target 30 is substantially identical. The target 30 may include a circuit board 46 electrically coupled to a connector 48, illustratively by conventional wires or cables 50. The connector 48 (illustratively, a Molex connector) may include a power input 52 (illustratively 5 volts), a ground 54, an address input 56, and a trigger output 58.

An address electromagnetic radiation emitter, illustratively light emitter 60, and a notification electromagnetic radiation emitter, illustratively light emitter 62, are illustratively supported by the circuit board 46. The address light emitter 60 illustratively comprises a near infrared (NIR) light emitting diode (LED) for emitting electromagnetic radiation, illustratively visible only through the visual augmentation system (VAS) 12 and having a wavelength of between about 750 nm and about 1 mm. In one illustrative embodiment, the address light emitter 60 emits electromagnetic radiation or light having a wavelength of approximately 940 nm. While this light is not visible to the human eye, image intensifier ($I^2$) tubes of NVGs are sensitive to this range of the light spectrum. In other words, the specifications of the address light emitter 60 are illustratively selected for being viewed by user 18 only by utilizing the VAS 12 (such as wearing NVG 14).

As further detailed herein, when activated or illuminated, the address light emitter 60 identifies an active or illuminated target 30. In certain illustrative embodiments, each target 30 may include a plurality of address light emitters 60 for emitting radiation of differing spectrums, including different wavelengths and/or amplitudes (i.e., intensities), as controlled by the central processing unit 24. In yet other illustrative embodiments, each address light emitter 60 may be individually adjusted by the central processing unit 24 for emitting radiation of differing spectrums, including different wavelengths and/or amplitudes (i.e., intensities).

The arrangement, placement, output characteristics (e.g., wavelength (e.g., color), light intensity, and/or divergence (e.g., magnification)), and control of the address light emitters 60 of the targets 30 may be varied to simulate various real-life situations or scenarios (e.g., combat conditions). For example, intensity and divergence of the light output from the light emitters 60 may be used to simulate close quarters or compact spaces. Backlighting of the area surrounding the active target 30 may be used to simulate clutter (e.g., foliage). Further, successive activation or illumination of different targets 30 may be used to simulate a moving target 30.

The notification light emitter 62 may be a light emitting diode (LED) similar to the address light emitter 60, but can have distinguishing output characteristics (e.g., wavelength (e.g., color) or light intensity) so that the user 18 may readily differentiate between the address light emitter 60 and the notification light emitter 62. As further detailed herein, the notification light emitter 62 identifies when an active target 30 has been hit by the engagement signal or light beam 36 from the user operated illuminator 34. In certain illustrative embodiments, each target 30 may include a plurality of notification light emitters 62 for emitting radiation of differing spectrums, including different wavelengths and/or amplitudes (i.e., intensities).

A light controller, illustratively a driver 63, is in electrical communication with each address light emitter 60 and notification light emitter 62 and may be supported on the circuit board 46. As further detailed herein, the central processing unit 24 may cause the driver 63 to activate light emitters 60 and 62 for generating electromagnetic radiation of different characteristics, such as spectrums (i.e., wavelengths), amplitudes (i.e., intensities), and/or divergences (i.e., light target sizes). The central processing unit 24 may cause the driver 63 to define such electromagnetic (EM) radiation characteristics.

The illustrative circuit board 46 also includes at least one visible light detector 64, illustratively such as first and second phototransistors 64a and 64b configured to detect the light beam 36 from the user operated emitter or illuminator 34. Illustratively, both phototransistors 64a and 64b must detect the engagement signal or light beam 36 (with a duration and an intensity level above predetermined thresholds) to prevent false detection. The circuit board 46 may also include conventional electrical circuitry (not shown), such as a hex inverter for use as a buffer, a quad two-input AND gate, a transistor and a plurality of resistors.

Figure 5:
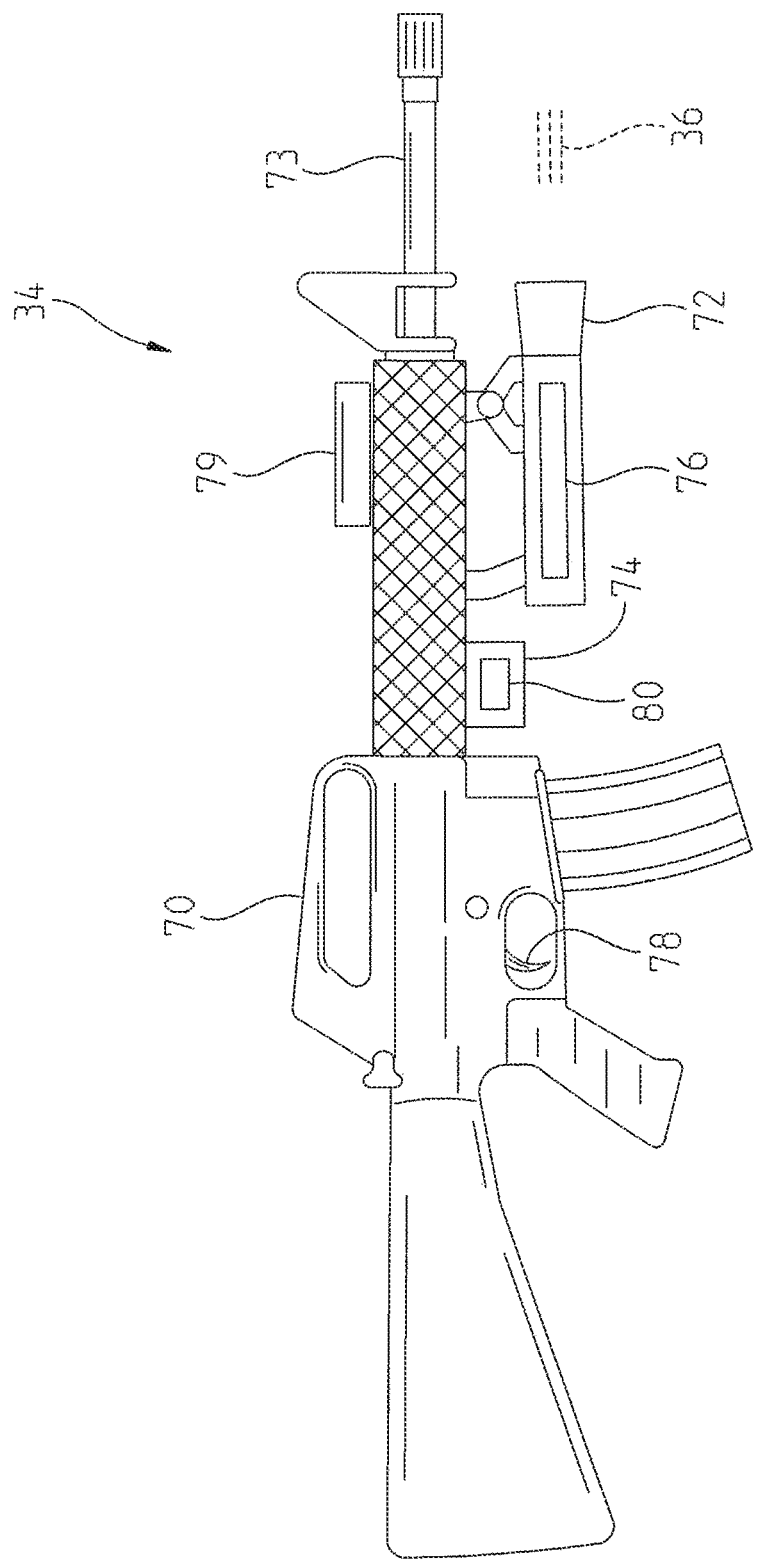
FIG. 5 is a side elevational view of an illustrative user operated emitter including an engagement signal transmitter coupled to a decoy weapon of the visual augmentation system effectiveness measurement apparatus of FIG. 1A.

An illustrative user operated emitter or illuminator 34 is shown in FIG. 5 as including a decoy weapon 70, illustratively a decoy M4 rifle (which may be referred to as an M4 simulator). The illuminator 34 illustratively includes an engagement signal transmitter, such as a time gated and controlled engagement signal source 72 (i.e., a flashlight), supported by a barrel 73 of the weapon 70, and illustratively below the barrel 73 in parallel alignment therewith. The illuminator 34 may be operably coupled to a control unit 74 and a power source 76. The control unit 74 is operably coupled to a user operated trigger 78. A targeting laser 79 is illustratively supported by the barrel 73 of the weapon 70, and illustratively above the barrel 73 in parallel alignment therewith. The targeting laser 79 may be of conventional design, such as a laser pointer, and is configured to assist the user 18 in aligning the engagement signal source 72 with the desired target 30.

The control unit 74 illustratively includes a processor 80 to control operation of the engagement signal source 72. Illustratively, the processor 80 includes a time delay relay, such as a Macromatic TR-61826, to provide a single pulse duration of light (i.e., light beam 36) in response to activation by the trigger 78. Illustratively, the engagement signal source 72 includes a guard function by only flashing light in duration of a millisecond pulse, followed by a delay of similar duration, to prevent extended illumination in which the user 18 could do sweeps with a constant or steady engagement signal (e.g., light beam 36) to impact multiple targets 30 in quick succession and potentially alter the results of the test. The power source 76 may include conventional batteries.

With further reference to FIGS. 1A and 2-3, the scan angle tracking system 22 illustratively includes first and second head scan markers, illustratively emitters 82 and 84, supported on opposite sides (i.e., left and right) of the head 16 of the user 18. In a further illustrative embodiment, a third head scan marker, illustratively emitter 86, is supported on the top of the user's head 16. The head scan emitters 82, 84 and 86 are illustratively configured to emit electromagnetic radiation, illustratively infrared light having a wavelength of about 940 nm. The head scan emitters 82, 84 and 86 are illustratively coupled to a helmet 88 supported by the user's head 16. Alternatively, the head scan emitters 82, 84 and 86 may be coupled to the head 16 of the user 18 through other conventional couplers, such as bands, straps and/or frames. While the head scan markers are illustratively light emitters 82, 84 and 86, other locator elements may be substituted therefore. For example, the head scan markers may be reflective stickers or labels, or other types of emitters (such as radio frequency (RF) emitters).

Figure 7A:
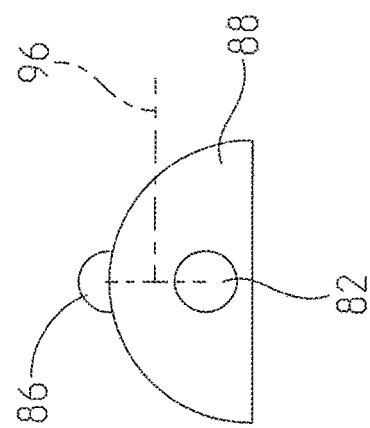
FIG. 7A is a diagrammatic view showing a elevational head scan angle determined by head scan emitters of the scan angle tracking system of FIG. 3, showing the user's head at a first elevational head scan angle.
Figure 7B:
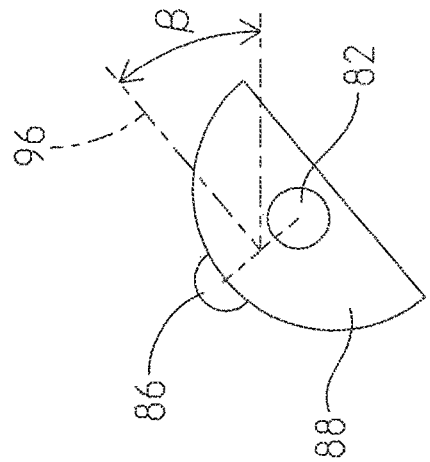
FIG. 7B is a diagrammatic view similar to FIG. 7A, showing the user's head at a second elevational head scan angle.
Figure 6A:
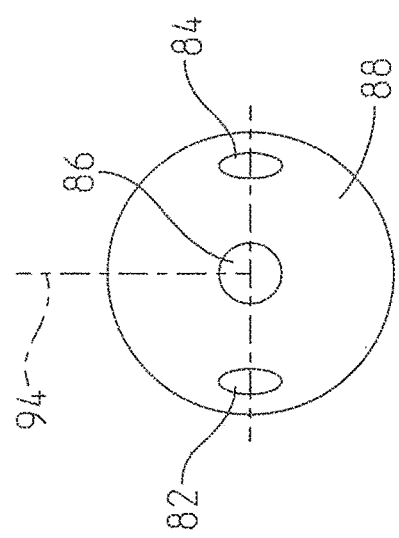
FIG. 6A is a diagrammatic view showing a horizontal head scan angle determined by head scan emitters of the scan angle tracking system of FIG. 3, showing a user's head at a first horizontal head scan angle.
Figure 6B:
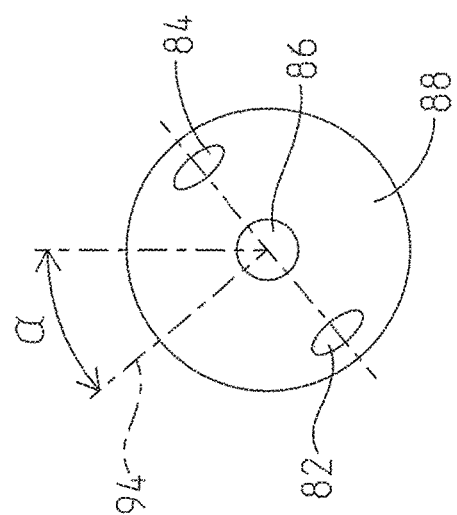
FIG. 6B is a diagrammatic view similar to FIG. 6A, showing the user's head at a second horizontal head scan angle.

With reference to FIGS. 1A, 2 and 6A-7B, a first or overhead camera 90 is illustratively positioned vertically above the user 18 (approximately 8 feet above the platform 32) to determine an azimuth or horizontal head scan angle α. A second or side camera 92 may be positioned to the side of the user 18 (approximately 2 feet from the head 16 of the user 18) to determine an elevational head scan angle β. The cameras 90 and 92 are configured to detect the electromagnetic (EM) radiation emitted from the head scan emitters 82, 84 and 86. More particularly, the cameras 90 and 92 may comprise thermal imaging (infrared) cameras for tracking movement of the head scan emitters 82, 84 and 86. As shown in FIGS. 6A and 6B, the head scan emitters 82 and 84 define a directional viewing axis 94. As the user 18 turns his or her head 16 to the left and right, horizontal head scan angle α is defined. As shown in FIGS. 7A and 7B, the head scan emitters 84 and 86 define a directional viewing axis 96. As the user 18 raises and lowers his or her head 16, elevational head scan angle β is defined.

As detailed above, the spacing between the head scan emitters 82, 84 and 86, and the cameras 90 and 92 is illustratively known. In certain illustrative embodiments, the spacing between the head scan emitters 82, 84 and 86 may be determined by the number of discrete elements (e.g., number of pixels) therebetween as measured by the cameras 90 and 92. Further, positioning and movement of the head scan emitters 82, 84 and 86 relative to the cameras 90 and 92 may be determined by the number of discrete elements (e.g., number of pixels) between the emitters 82, 84 and 86 as measured by the cameras 90 and 92. The distance is dependent upon pixel density (i.e., resolution) of the cameras 90 and 92.

The central processing unit 24 illustratively includes a master control board 102 having a power board 104, a plurality of address control boards or circuits 106, a data acquisition board (DAQ) 108, and a memory 110. Each control circuit 106 is illustratively configured to control two separate targets 30. The power board 104 is electrically coupled to a power supply 112 (e.g., 110 volts) and to the data acquisition board 108. To turn on or activate a single target 30, the DAQ 108 provides a 4-bit address to the power board 104, and each address control circuit 106 compares that address with its two assigned addresses that are provided by an 8 pin DIP switch.

Each address control circuit 106 illustratively includes two connectors (not shown) that couple with connectors 48 of a pair of respective targets 30. More particularly, each connector may be a standard connector (e.g., Molex) configured to cooperate with connector 48 (e.g., in a pin and socket arrangement) and including a power (illustratively, 5 volts), ground, address output, and trigger input, that are in electrical communication with target 30 via an extension cable (not shown). When the address control circuit 106 confirms a matched address thereby defining an addressed target, the address output goes high. The target LED 60 is then illuminated thereby defining an illuminated or active target 30, and waits for a trigger. When the light detectors 64a, 64b of the active target 30 are illuminated from engagement signal 36 (e.g., light beam with a duration and an intensity level above predetermined thresholds), the trigger output goes high, and the address control circuit 106 sends a signal back to the DAQ 108, thereby defining a hit target 30. As further detailed herein, control instructions embodied in software stored in memory 110 of the central processing unit 24 provides the time elapsed from when the target 30 became active to when the target 30 was hit/engaged.

Figure 8:
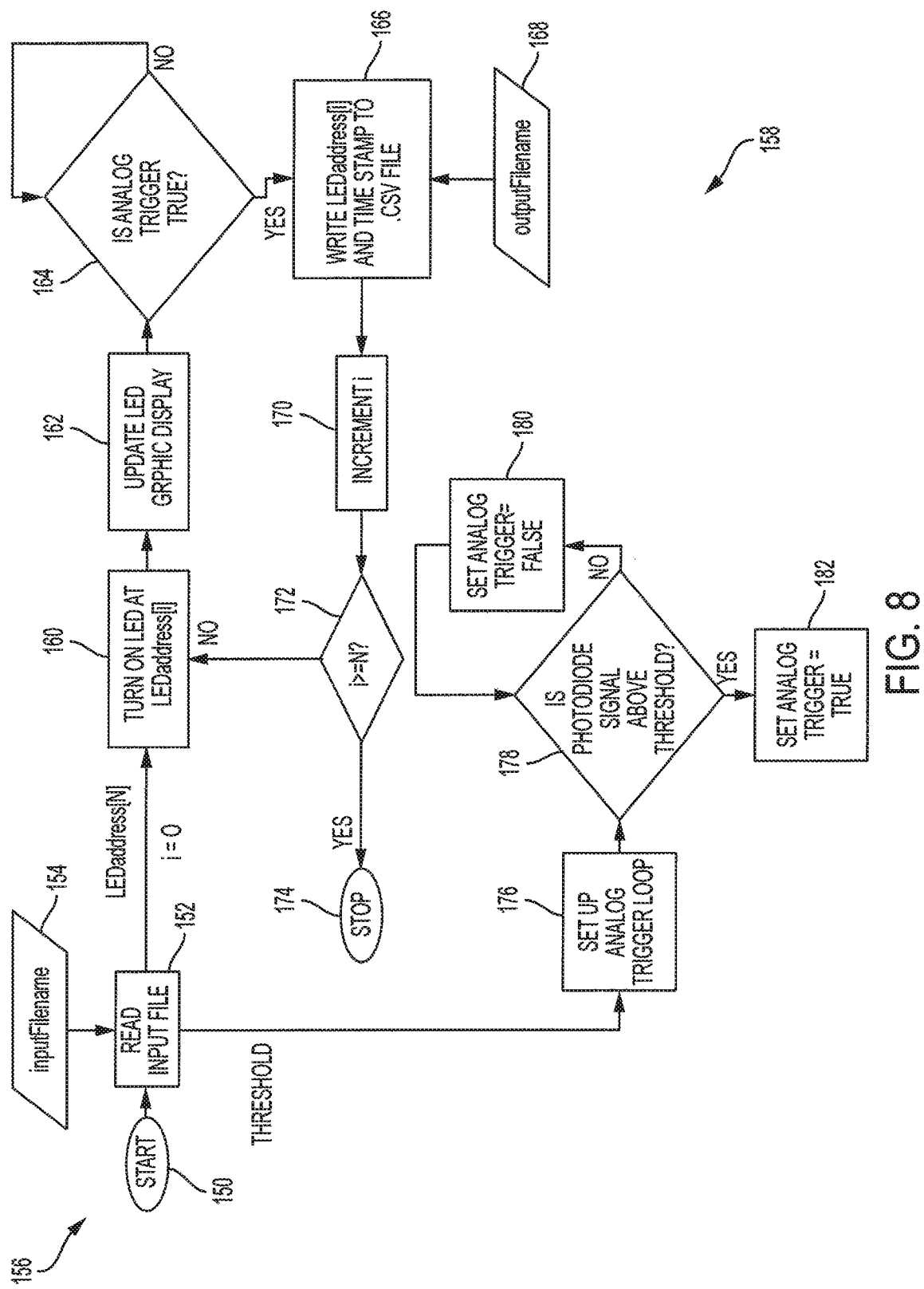
FIG. 8 is an illustrative operational flow chart of the logical control of the response time evaluation system of FIG. 3.

FIG. 8 is an illustrative operational flow chart of the response time evaluation system 20 of FIG. 3 as implemented by control instructions embodied in software stored in memory 110 of the central processing unit 24. In one illustrative embodiment, these control instructions are written in LabView code.

Figure 9A:
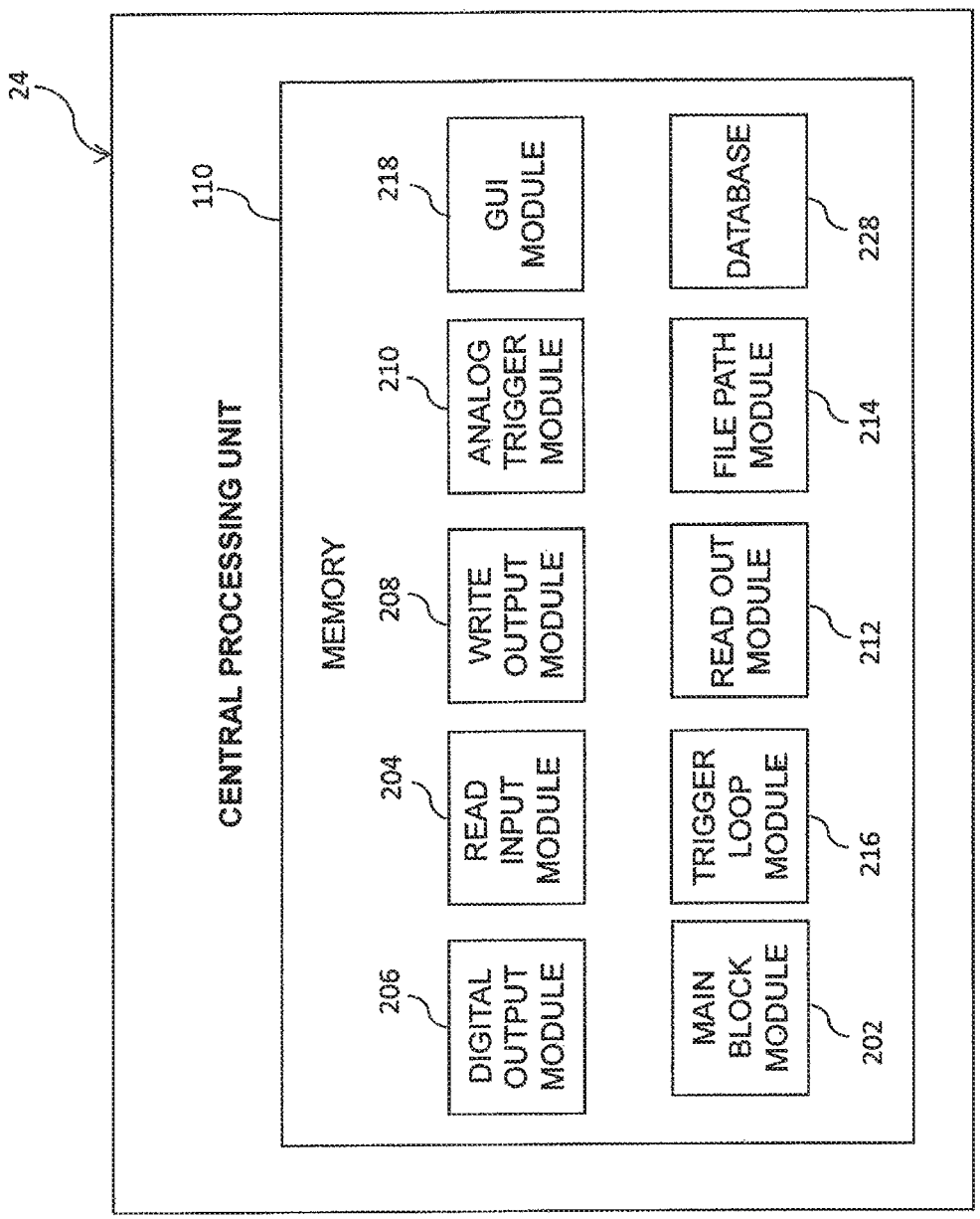
FIG. 9A is a diagrammatic view of virtual instrument (VI) modules representing exemplary software implemented functions or subroutines for performing various tasks of the illustrative embodiment visual augmentation system effectiveness measurement apparatus of FIG. 1A.
Figure 9B:
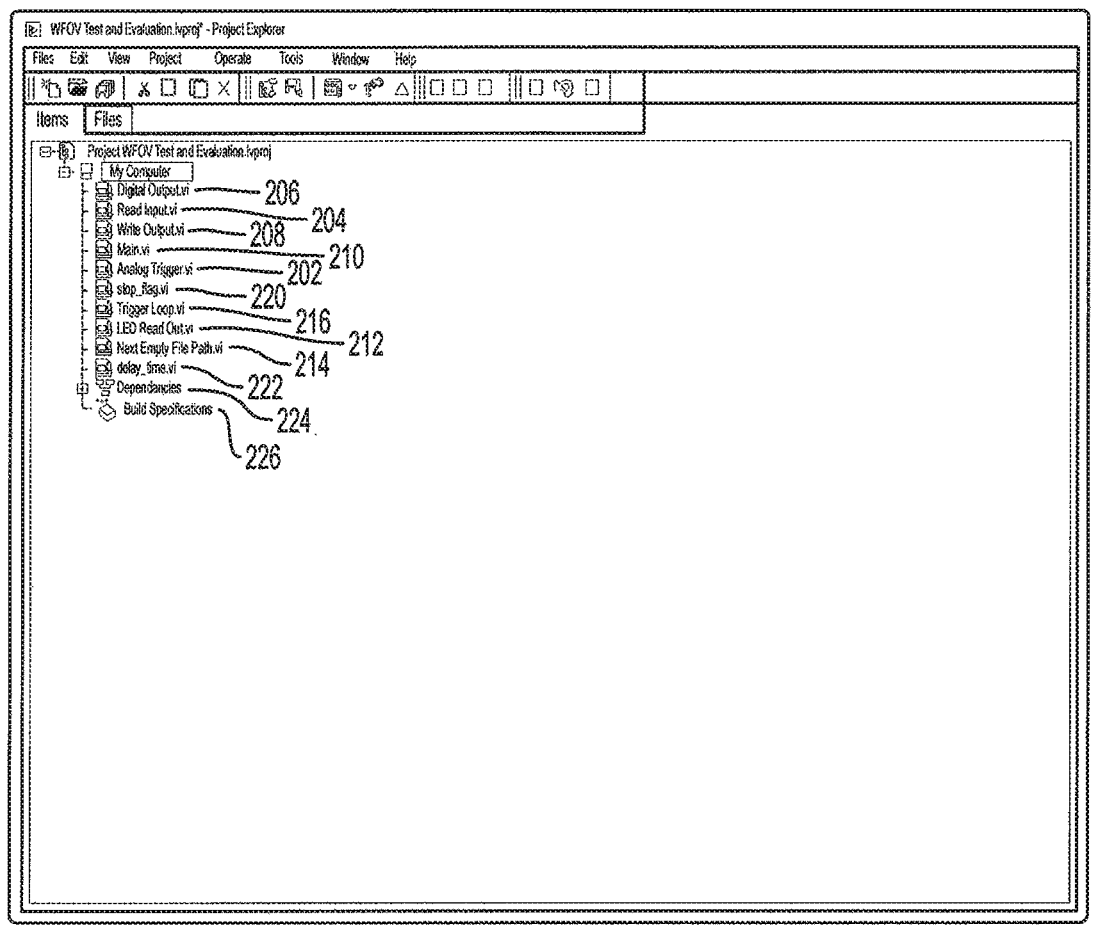
FIG. 9B is a view of an illustrative graphical user interface of the virtual instrument (VI) modules of FIG. 9A.

FIGS. 9A and 9B illustrate exemplary control sections or virtual instrument (VI) modules stored in memory 110 of the central processing unit 24 for implementing the functions in the flow chart of FIG. 8. More particularly, FIG. 9A is a diagrammatic view of the control sections or virtual instrument (VI) modules representing exemplary software implemented functions or subroutines for performing various tasks of the illustrative embodiment visual augmentation system effectiveness measurement apparatus 10 of FIG. 1. FIG. 9B is a view of the control sections or VI modules of FIG. 9A as shown in an illustrative graphical user interface (GUI) for use by operator 29. For example, control sections or VI modules can include graphical user interface (GUI) selected programming blocks operably coupled to a variety of VI modules, such as: main block module 202, read input module 204, digital output module 206, write output module 208, analog trigger module 210, LED read out module 212, next empty file path module 214, trigger loop module 216, stop flag 218, and delay time 220. A database 222 is configured to cooperate with the modules 202, 204, 206, 208, 210, 212, 214, 216, 218 and 220, and may store data, including addresses of targets 30 and other variables.

With further reference to FIG. 8, operation of the response time evaluation system 20 begins at start block 150 wherein the user 18 turns on the system 20 at which time variables in memory 110 of the central processing unit 24 may be initialized. At block 152, the central processing unit 24 reads an address from a library of random target addresses 154 stored in the database 222. Target processing subroutine 156 and trigger processing subroutine 158 branch off from block 152. At block 160 of the target processing subroutine 156, the central processing unit 24 activates the address light emitter 60 of the addressed target 30 (i.e., target 30 with address LEDaddress[i]). The process continues to block 162 where the GUI (FIG. 18) is updated to indicate that the light emitter 60 of the addressed target 30 is illuminated. At decision block 164, the central processing unit 24 determines if the addressed target 30 has received light above a certain threshold (e.g., hit by light beam 36 from the user operated emitter or light gun illuminator 34 having an intensity and a duration above predetermined thresholds). This information is illustratively supplied from the trigger processing subroutine 158.

More particularly, at block 164 the central processing unit 24 determines if an analog trigger variable (AnalogTrigger) is set to true. If not, then the process continues to inquire about the status of the analog trigger variable. If at decision block 164, the analog trigger variable (AnalogTrigger) is set to true, then the process continues to block 166, where the target address (LEDaddress[i]) and a trigger time stamp is stored in the database 222. At block 168, this information may then be stored in the database 228 (outputFilename).

The target processing subroutine 156 continues at block 170 wherein the target address (LEDaddress[i]) is incremented to the next target address in the address library. At decision block 172, the central processing unit 24 determines if the number of targets 30 activated (i) is equal to or greater than the total number of targets 30 (N). If not, then the process returns to block 160. If yes, then the process stops at block 174.

With further reference to FIG. 8, at block 176 of the trigger processing subroutine 158, the analog trigger loop is established. At decision block 178, the central processing unit 24 determines if the light received by the light detectors 64a, 64b exceeds a predetermined threshold. If not, the process continues to block 180 where the central processing unit 24 sets the analog trigger variable (AnalogTrigger) to be false. If yes at block 178, then at block 182 sets the analog trigger (AnalogTrigger) to be true. The information from block 178 is utilized by the central processing unit 24 at block 164 of the target processing subroutine 156.

Figure 10:
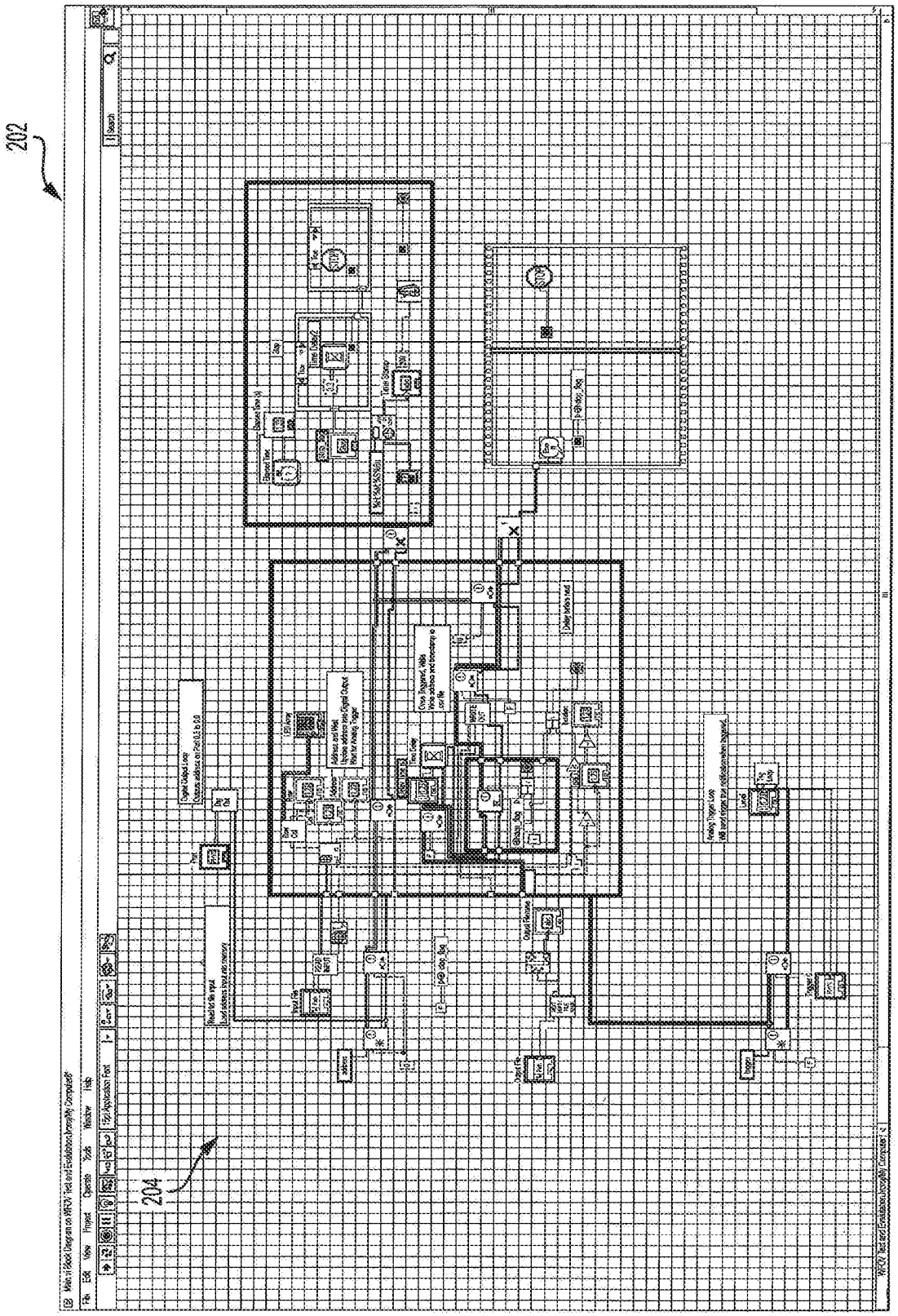
FIG. 10 is a diagrammatic view of an exemplary main block virtual instrument (VI) module of FIG. 9B.

With reference to FIGS. 9A-10, exemplary main block module 202 performs functions illustrated in the flow chart detailed in FIG. 8. Exemplary read input module 204 receives as input an inputFilename path, and performs functions encapsulated in block "Read input file" in FIG. 8 which parses the number values stored in the database 228, and assigns the numbers to an output array called LED Array Input which contains an array of size N containing LEDaddress values (e.g. see FIG. 8).

Figure 11:
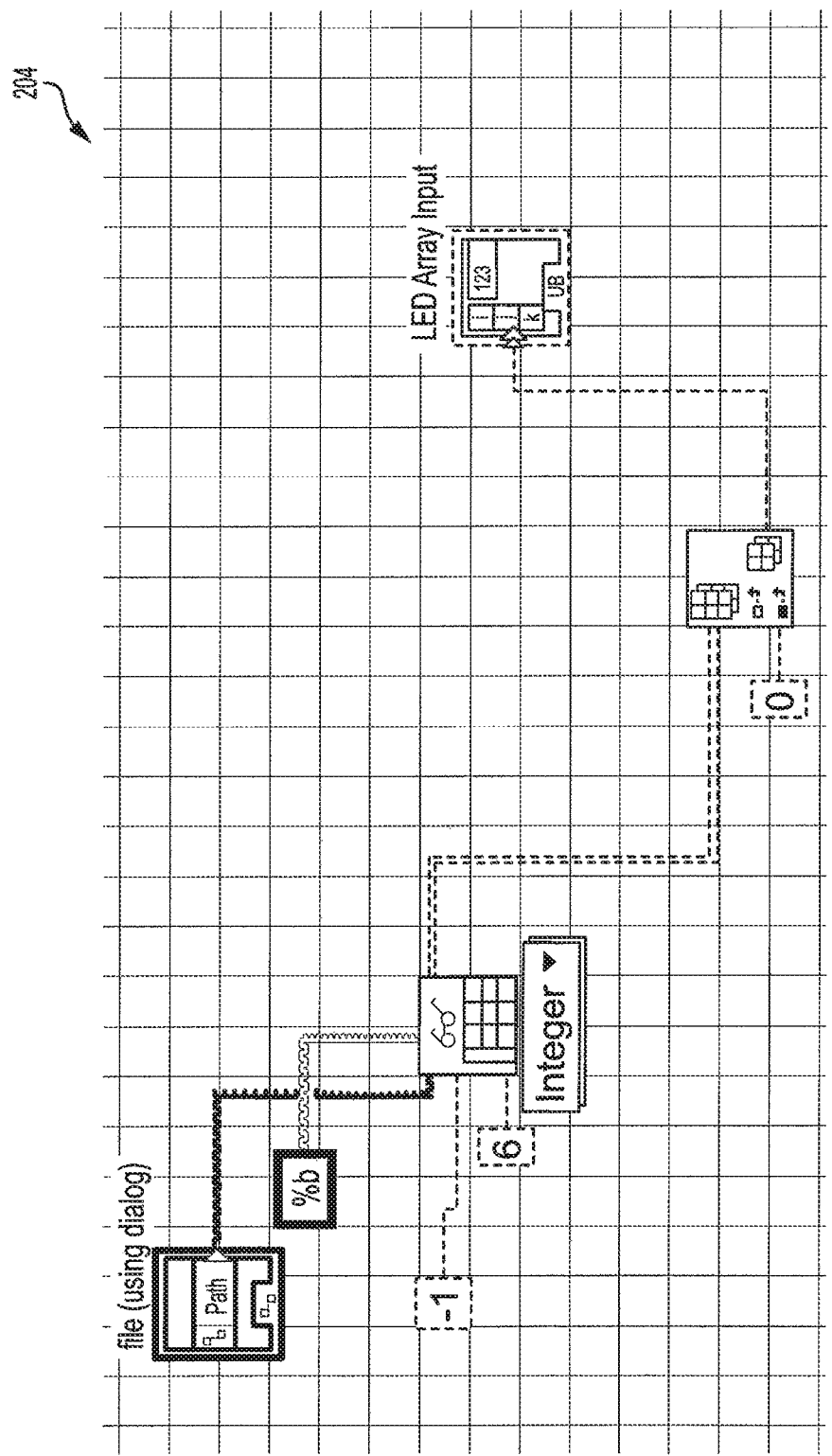
FIG. 11 is a diagrammatic view of an exemplary read input virtual instrument (VI) module of FIG. 9B.

With reference to FIG. 11, exemplary read input module 204 receives as input an inputFilename path, and performs functions encapsulated in block "Read input file" in FIG. 8. This embodiment of the VI reads the file specified by inputFilename path, parses the number values stored in the file, and assigns the numbers to an output array called LED Array Input which contains an array of size N containing LEDaddress values (e.g. see FIG. 8). Exemplary VI Digital Output receives as input LED address (e.g. see FIG. 8) and performs functions "Turn on LED at LEDaddress[i]" in FIG. 8 that activate hardware outputs on the connector block coupled to respective target 30.

Figure 12:
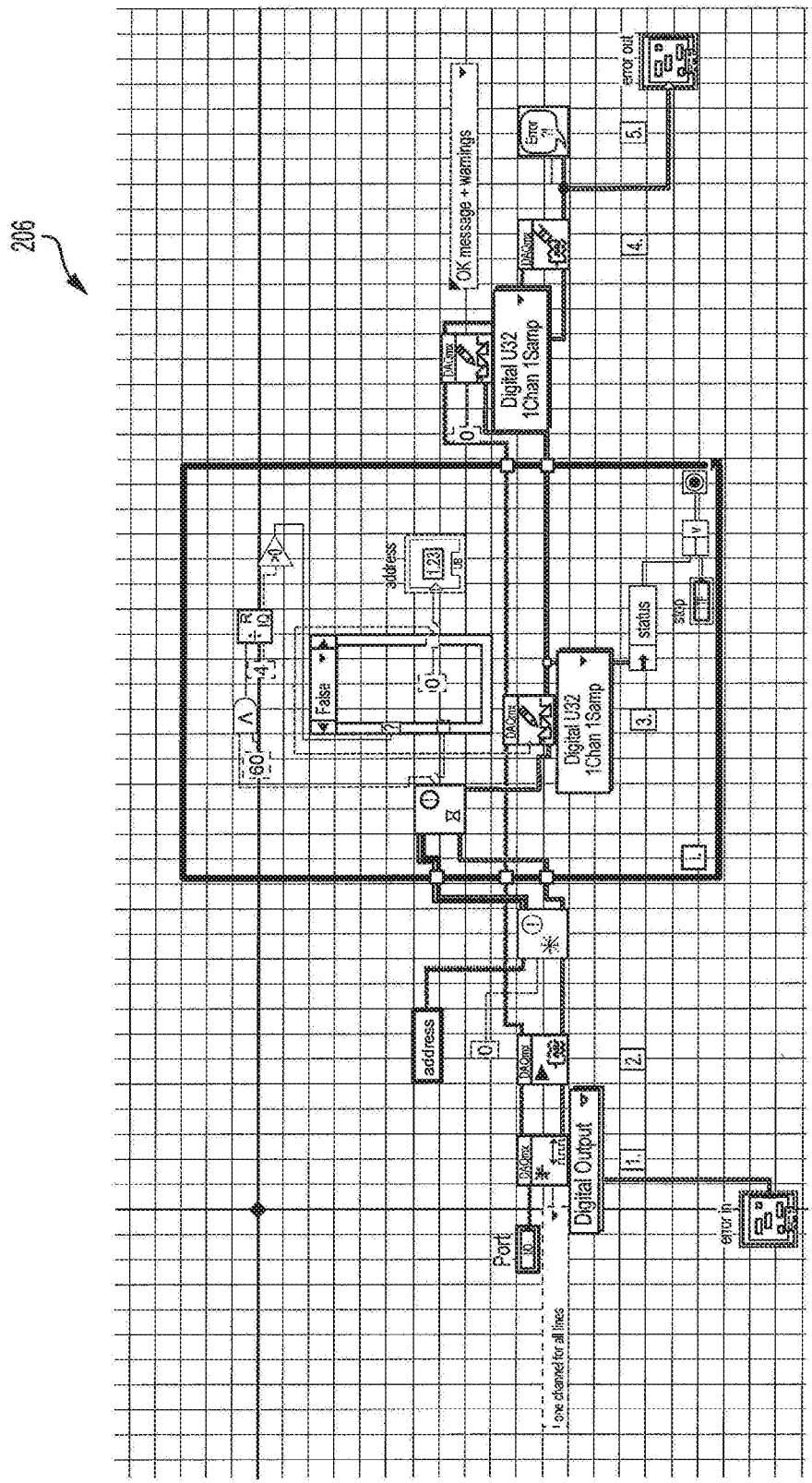
FIG. 12 is a diagrammatic view of an exemplary digital output virtual instrument (VI) module of FIG. 9B.

Referring now to FIG. 12, exemplary digital output module 206 receives as input LEDaddress (e.g. see FIG. 8) that specifies one or more exemplary targets 30 (see FIG. 4) to be activated, an Output Port Name of the connector block, and Error In values, and performs functions encapsulated in block "Turn on LED at LEDaddress[i]" in FIG. 8. First, a Digital Output Port is configured to change certain voltage values of output ports on the connector block hardware using the Output Port Name. For example, a Digital Output Port may have eight output subports to represent a byte, or eight bits, to represent a digital number in binary, such as the number 11 which can be represented as 00001011 in binary. In this example, 00001011 would change the voltage to a high value in ports 5, 7, and 8. Then, this embodiment of the VI module 206 continuously monitors the LEDaddress input, validates LEDaddress input is within the acceptable ranges of target addresses, and then sends LEDaddress input as a digital signal output to Digital Output Port value (e.g. an Address input value of 12 can be represented as 00001100 in binary, which would turn ports 5 and 6 on, i.e. change the voltage of that subport to a high value). Connector block hardware electronically changes the voltage values of Digital Output Port subports using Digital Output Port value. Digital Output Port on connector block is electronically connected to the Address Circuit Board. Error In values pass through to Error Out value output, and will stop the VI module 206 from running if an error is present in software.

Figure 13:
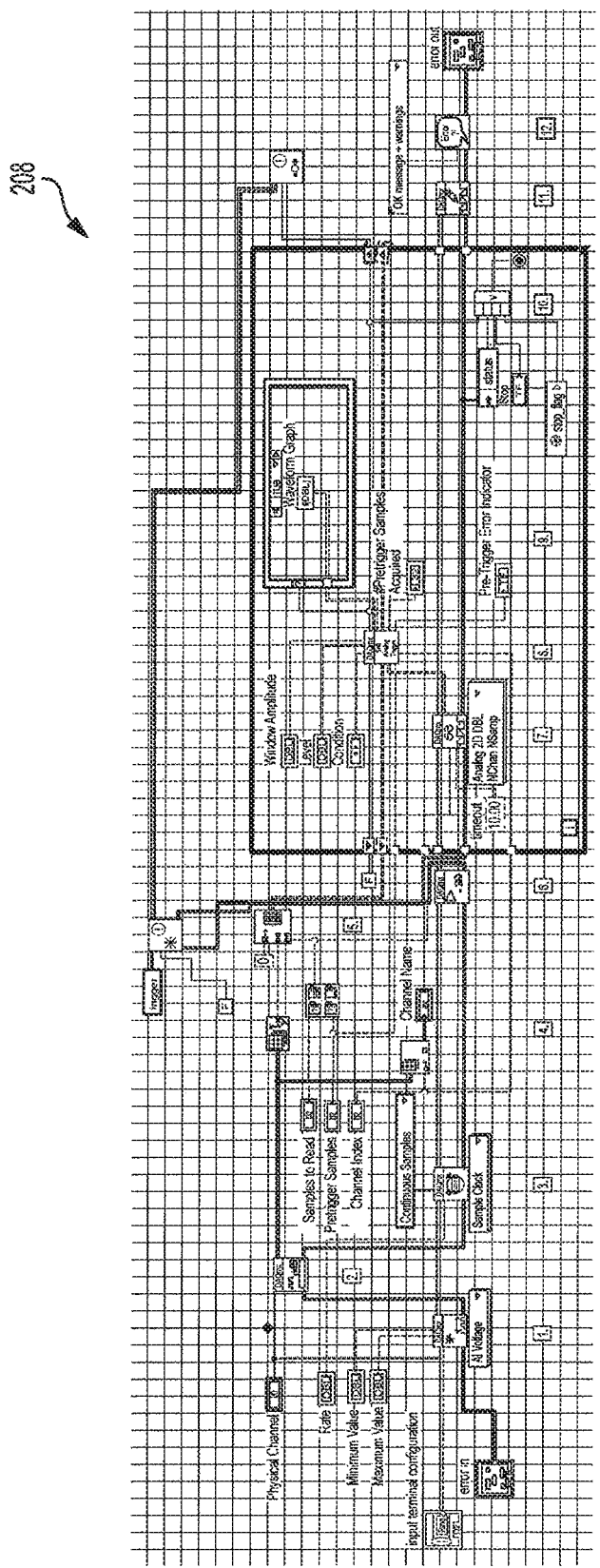
FIG. 13 is a diagrammatic view of an exemplary analog trigger virtual instrument (VI) module of FIG. 9B.

With reference to FIG. 13, exemplary write output module 208 receives as input an outputFilename path, a Number value, and an Error In value, and performs functions encapsulated in block "Write LEDaddress[i] and time stamp to.csv file" in FIG. 8, which opens or creates the file if it does not exist, and appends the Number value in binary (e.g. LEDaddress in FIG. 8) and the time stamp to the end of the file.

Exemplary write output module 208 receives as input an outputFilename path, a Number value, and an Error In value, and performs functions encapsulated in block "Write LEDaddress[i] and time stamp to.csv file" in FIG. 8. This embodiment of the VI opens or creates the file if it does not exist, and appends the Number value in binary (e.g. LEDaddress in FIG. 8) and the time stamp to the end of the file.

Figure 14:
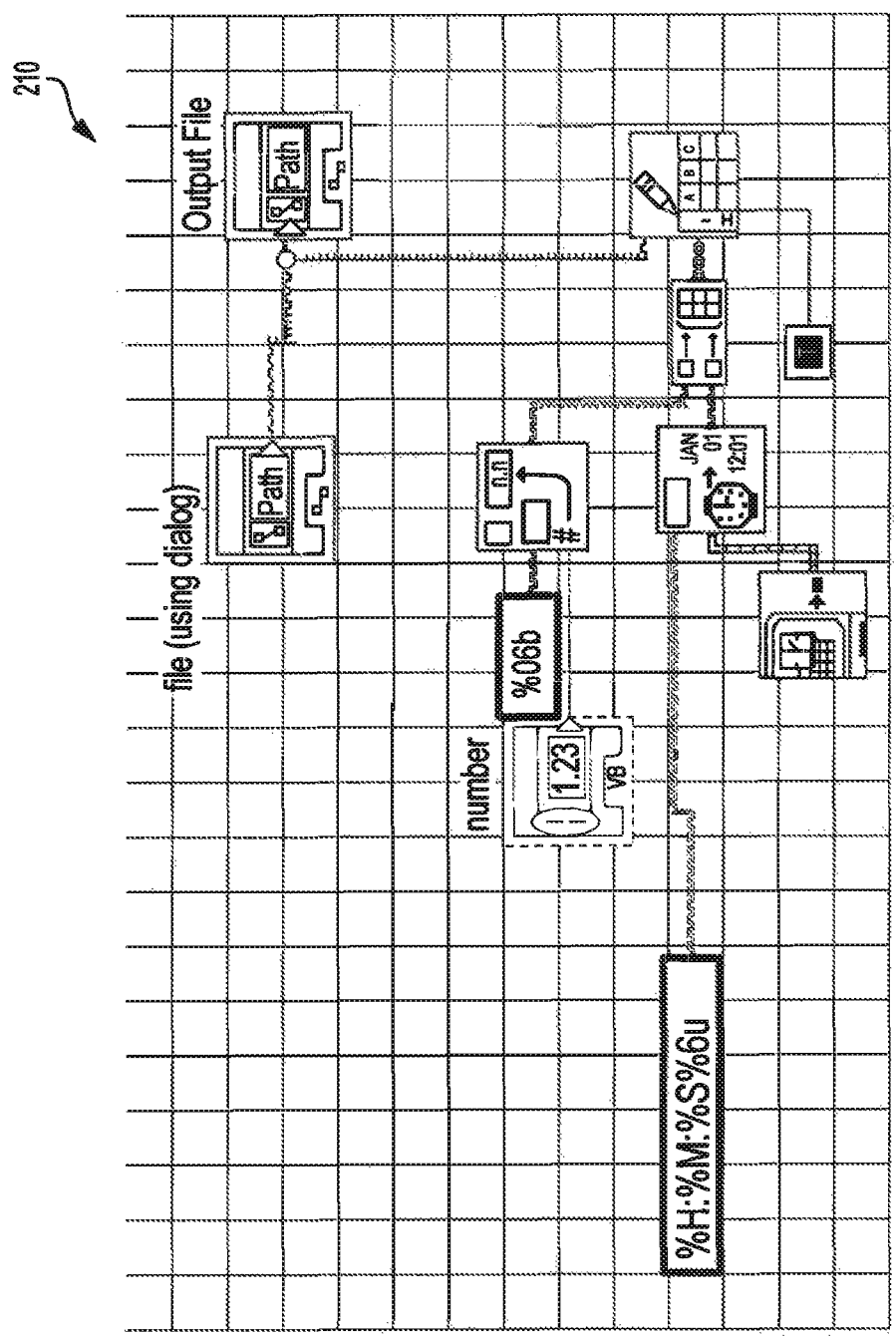
FIG. 14 is a diagrammatic view of an exemplary write output virtual instrument (VI) of FIG. 9B.

Referring now to FIG. 14, exemplary analog trigger module 210 receives as input Physical Channel information, Threshold Level, and performs functions encapsulated in blocks "Set up Analog Trigger Loop", "Is Photodiode Signal above threshold", "Set Analog Trigger=false", and "Set Analog Trigger=true" in FIG. 8, which continuously monitors the Photodiode Signal, and compares with Threshold Level until the Stop Flag is set to true, and the program exits. More particularly, Physical Channel information describes the electronic input port on the Connector Block hardware that will receive the Photodiode Signal input. Threshold Level is the voltage value setting that the Photodiode Signal input is compared with, and if Photodiode Signal input is above Threshold Level, the Analog Trigger value to be set to true. This embodiment of the VI continuously monitors the Photodiode Signal, and compares with Threshold Level until the Stop Flag is set to true, and the program ends. Exemplary VI stop_flag is a shared variable which provides information to the whole program when the program is to stop operation and shutdown.

Figure 15:
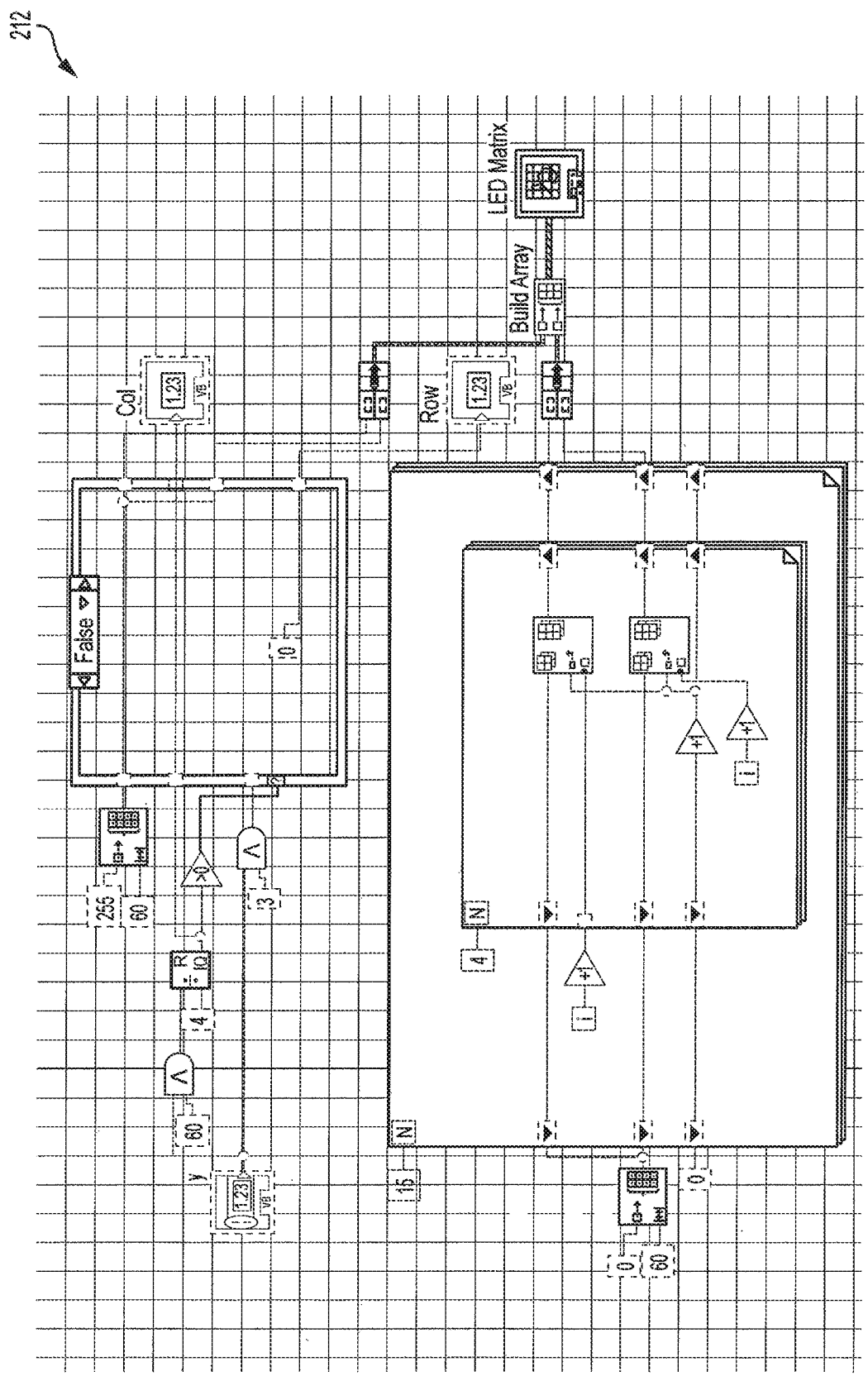
FIG. 15 is a diagrammatic view of an exemplary LED read out virtual instrument (VI) module of FIG. 9B.
Figure 18:
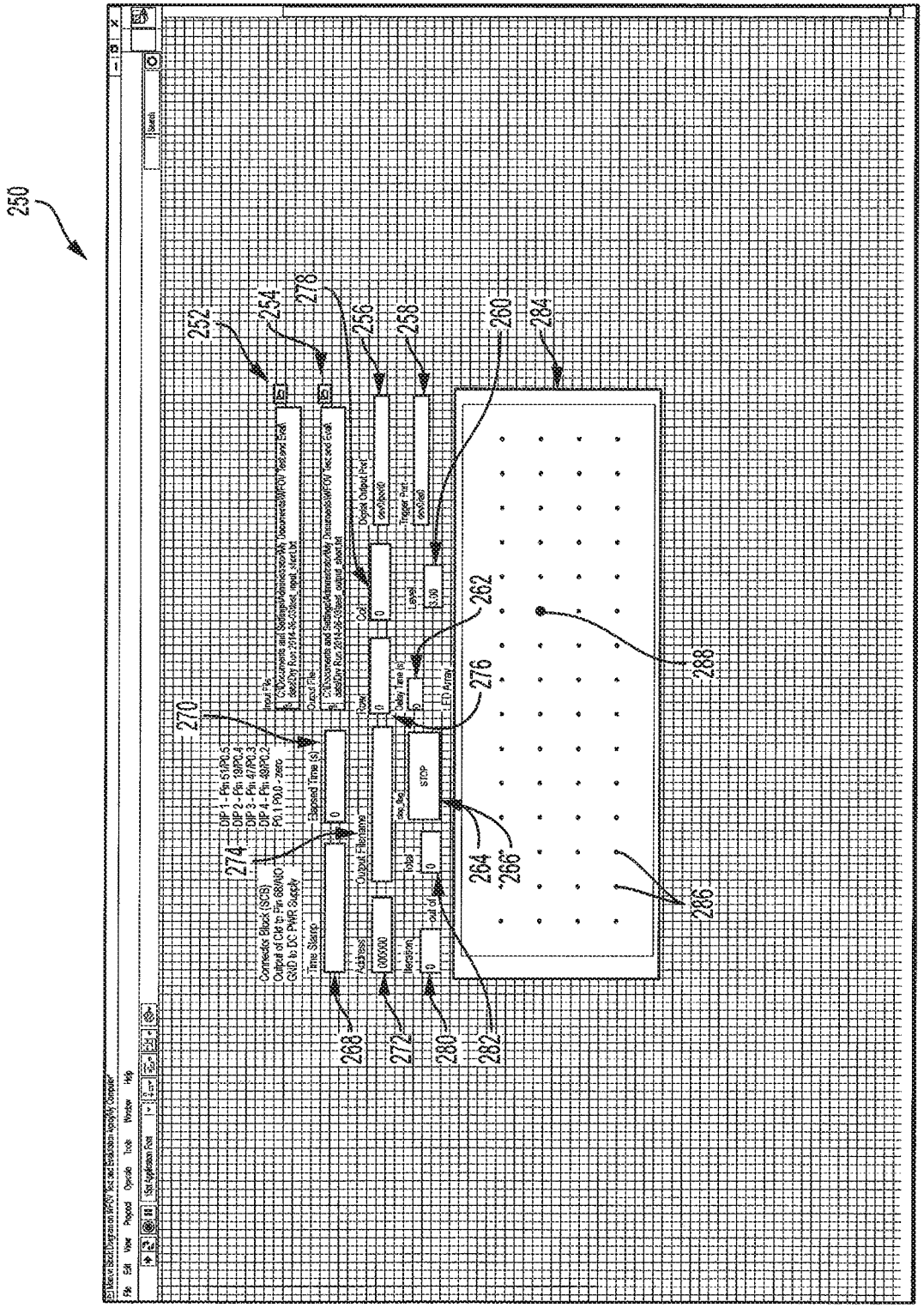
FIG. 18 is a view of an illustrative main graphical user interface (GUI) of the visual augmentation system effectiveness measurement apparatus of FIG. 1A.

As shown in FIG. 15, exemplary read out module 212 receives as the current LEDaddress value and outputs Row and Col which is the row and column of LED array, respectively, and the LED Matrix variable that is used to create a grid display which displays LED Array information containing available target locations in a grey color, and the illuminated target in a green color (e.g. see the Main Graphical User Interface LED Array in FIG. 18). Exemplary VI Next Empty File Path receives a outputFilename path that points to a file, and if that file already exists, it will append a number to the end of the file name and recheck until it finds a valid file name that is not in use. Exemplary VI delay_time is a shared variable which provides information to the whole program of the time at which to pause in between target addressing if so desired. Other elements include a dependencies and a build specification section.

With reference to FIGS. 15 and 18, LED Read Out shows an exemplary VI LED Read Out that receives as input y which is the current LEDaddress value and outputs Row which is the row of LED array, Col which is the column of LED Array, and the LED Matrix variable that is used to create a grid display which displays LED Array information containing available target locations in a grey color, and the illuminated target in a green color.

Figure 16:
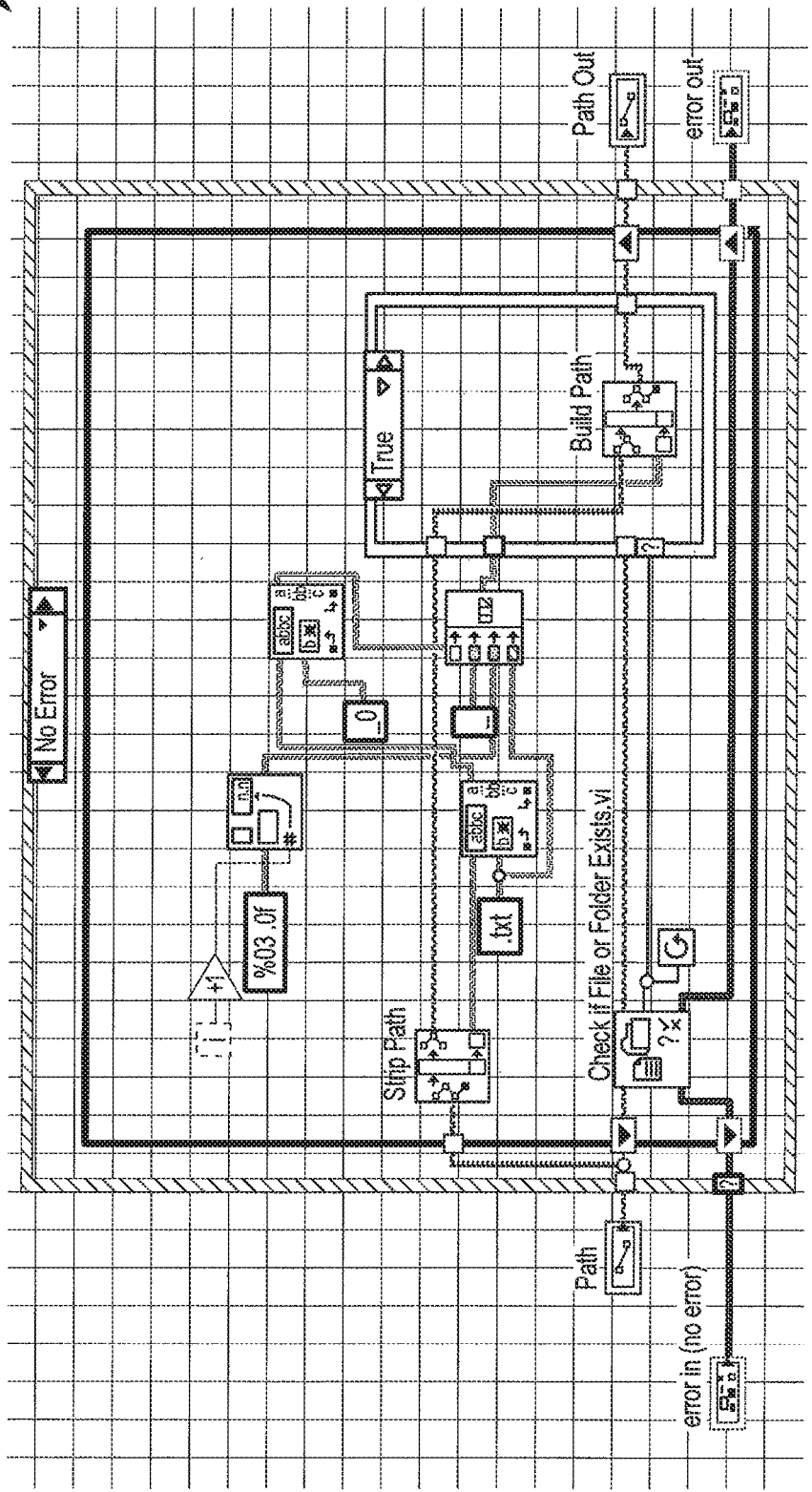
FIG. 16 is a diagrammatic view of an exemplary next empty file path virtual instrument (VI) module of FIG. 9B.

With reference to FIG. 16, exemplary next empty file path module 214 will take in a file path that points to a file, and if that file already exists, it will append a number to the end of the file name and recheck until it finds a valid file name that is not in use.

Figure 17:
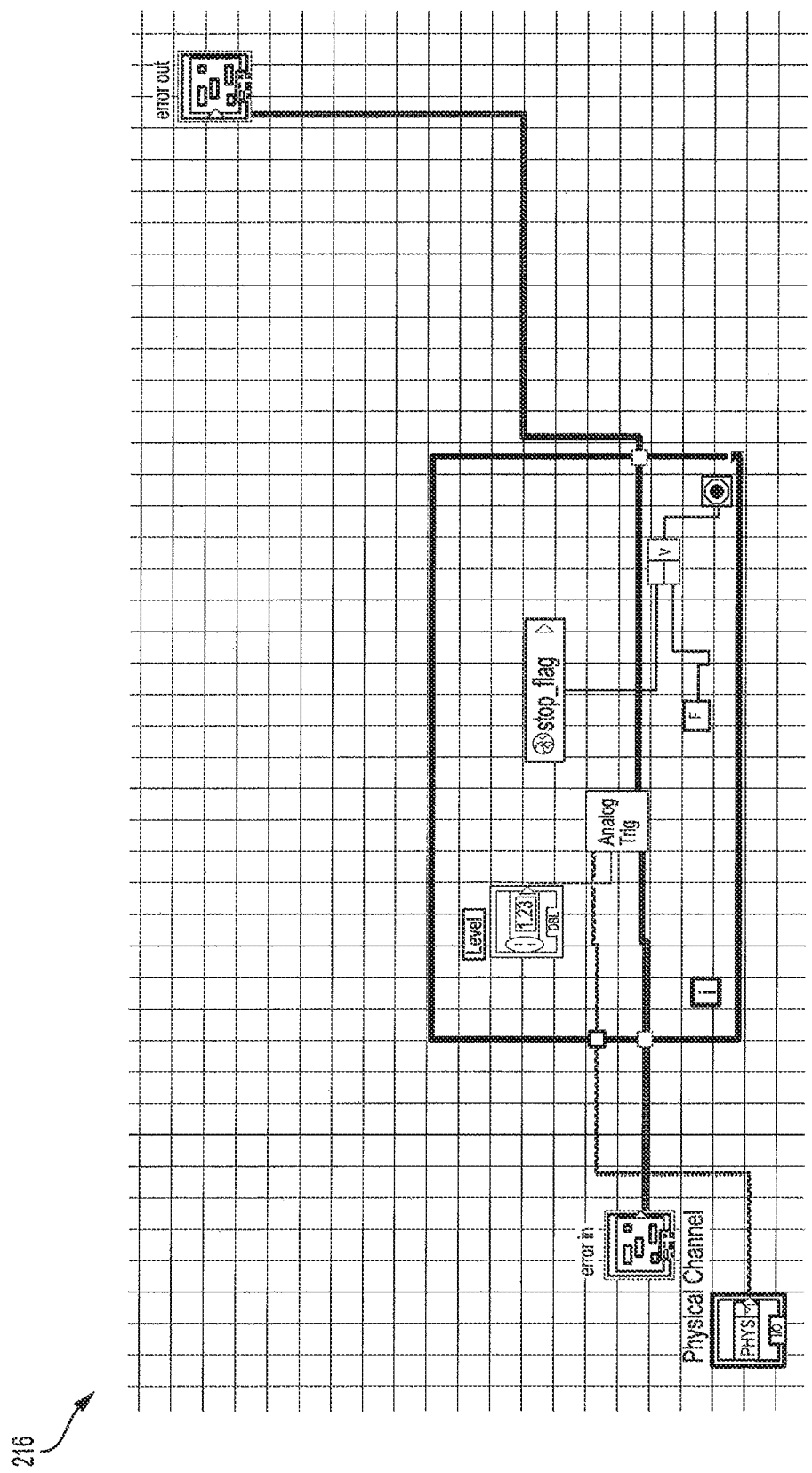
FIG. 17 is a diagrammatic view of an exemplary trigger loop virtual instrument (VI) of FIG. 9B.

FIG. 17 illustrates exemplary trigger loop module 216 that receives as input Level which is the Threshold Value (e.g. see Fig. Analog Trigger), Physical Channel (e.g. see Fig. Analog Trigger), and Error In value. This VI ensures Analog Trigger VI is set and reset properly after a given target is illuminated.

FIG. 18 shows an illustrative graphical user interface (GUI) 250 as generated by the graphical user interface (GUI) module 218 of FIG. 9A in accordance with one exemplary embodiment of the disclosure. In particular, the GUI 250 includes user input Input File 252 which enables a user to enter the filename path of the input (i.e. inputFilename in FIG. 8), and user input Output File 254 which enables a user to enter the filename path of the output (i.e. outputFilename in FIG. 8). Illustrative GUI 250 further includes user input Digital Output Port 256 which enables a user to enter or select the Output Port Name value describing the Digital Output Port in Figure Digital Output, and user input Trigger Port 258 which enables a user to enter or select the Physical Channel information describing the Photodiode Signal input (e.g. see Analog Trigger of FIG. 13).

With further reference to the illustrative GUI 250 of FIG. 18, user input Level 260 determines the Threshold Level value (e.g. see Analog Trigger of FIG. 13), and user input Delay Time 262 introduces a small delay in between activation of successive targets 30, if desired. User input Stop 264 will end the program, while a user input Start 266 enables the operator 29 to begin the program. An indicator Time Stamp 268 displays the current time in millisecond precision; an indicator Elapsed Time 270 displays the time difference between the last target 30 and the current target 30 engagement, and an indicator Address 272 displays the current LEDaddress value. An indicator Output Filename 274 displays the filename of the output data, while indicators Row and Col 276 and 278 display the row and column of the LED target 30, respectively. Indicator Iteration 280 displays the current iteration number, indicator Total 282 displays the total number of LED addresses, (i.e. the variable N in FIG. 8), and a grid display 284 displays LED Array information containing available target locations in a grey color 286, and the illuminated target in a green color 288.

Figure 19:
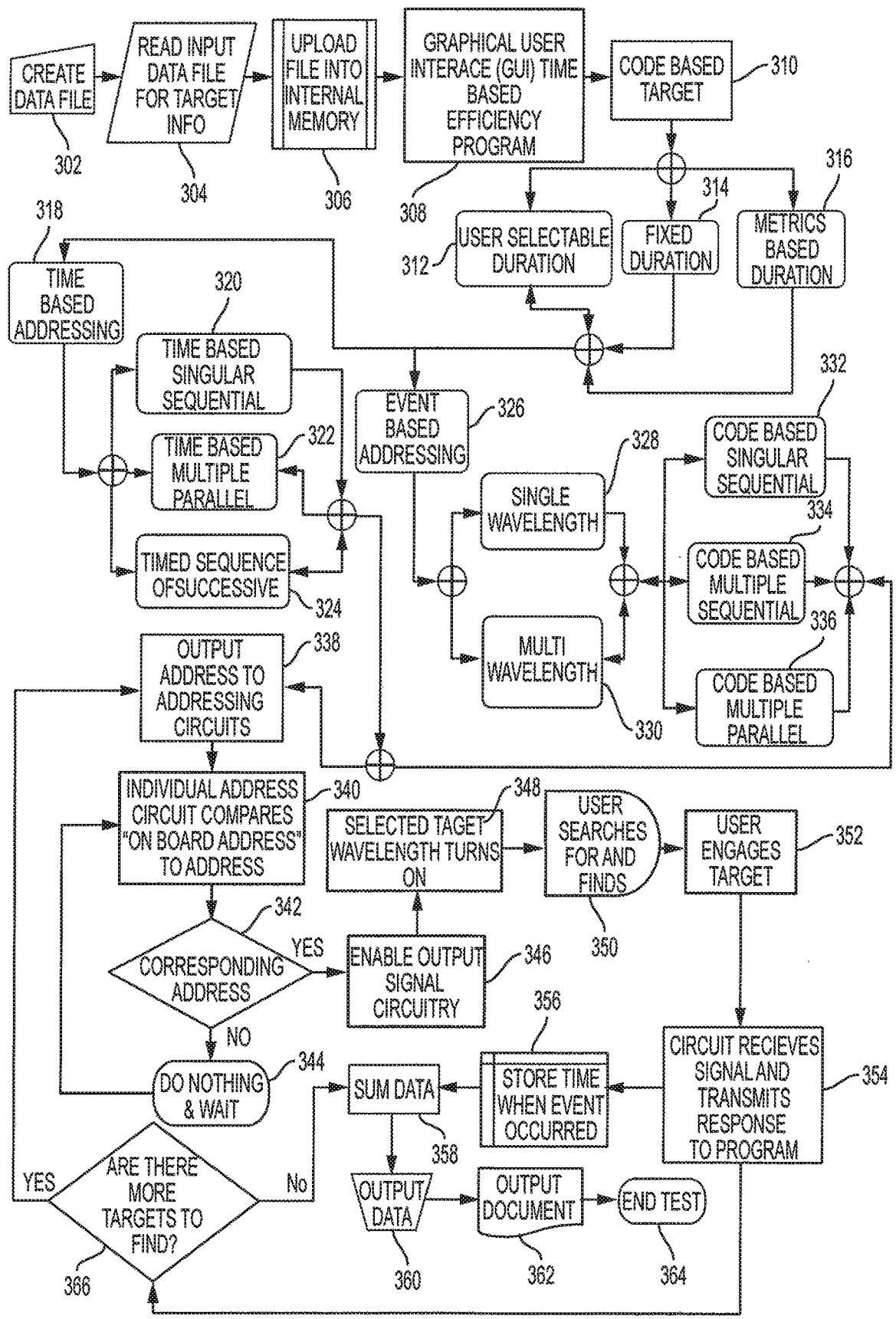
FIG. 19 is an illustrative operational flow chart of the response time evaluation system of FIG. 3.

FIG. 19 is an illustrative operational flow chart of the response time evaluation system 20 of FIG. 3. The process illustratively begins at block 302 where a data file is created. At block 304, the data is read by the central processing unit 24. At block 306, the data is stored in the database. At block 308, the graphical user interface (GUI) is generated. At block 310, the targets 30 are coded based upon different criteria. More particularly, blocks 312, 314 and 316 define the basis for the duration of the response time evaluation/training event. The user 18 may select a duration for the response time evaluation/training event at block 312. A preset fixed or standard duration for the response time evaluation test/training event may be provided at block 314. Alternatively, at block 316 the duration of the evaluation test/training event may be metric based. In the metric based duration may be based on improving certain measured test parameters, such as certain scan angles and/or scan efficiencies. For example, the central processing unit 24 may adapt duration of illumination of successive address light emitters 60 based upon tracked performance of the user 18. For example, the quicker the response time of the user 18, the shorter the illumination duration and subsequent delays between successive illuminations.

With further reference to FIG. 19, the illustrative process continues at one of blocks 318 and 326. For time based addressing of targets 30, the process continues at block 318, and then to one of blocks 320, 322 and 324. At block 320, time based singular sequential addressing is defined where a single target 30 is addressed for a predetermined time until the occurrence of an event, then successive additional targets 30 are addressed, each for a predetermined time until occurrence of an event. An event is illustratively defined when a user engages a target 30, or when a metric based condition is satisfied (e.g., a predefined time interval passes, a user sweeps the engagement signal 36 past at least one target 30, etc.). At block 322, multiple parallel addressing is defined where multiple targets 30 are simultaneously addressed, followed by successive additional multiple targets 30 are addressed. At block 324, a timed sequence of successive targets 30 are addressed where a plurality of different targets 30 are successively addressed over a predetermined time period.

For event based addressing of targets 30, the illustrative process continues at block 326 for event based addressing, and then proceeds to one of blocks 328 and 330. At block 328, single wavelength addressing is defined where a single wavelength is configured to be emitted by the address light emitter 60. At block 330, a multiple wavelength addressing is defined where multiple wavelengths are configured to be emitted by the address light emitter 60. The process then continues at one of blocks 332, 334 and 336. At block 332, code based singular sequential addressing is defined where a single target 30 is addressed for a predetermined time until the occurrence of an event, then successive additional targets 30 are addressed, each for a predetermined time until occurrence of an event. This process may be similar to the time based addressing defined in block 320, but is event based (for example, an event could be visible light detection by the light detectors 64a, 64b). At block 334, multiple sequential addressing is defined where multiple targets 30 are simultaneously addressed, followed by successive additional multiple targets 30 being addressed. This process may be similar to the time based addressing defined in block 324, but is event based. At block 336, code based multiple parallel is defined where a timed sequence of successive targets 30 are addressed where a plurality of different targets 30 are successively addressed over a predetermined time period. This process may be similar to the time based addressing defined in block 322, but is event based.

With further reference to FIG. 19, the illustrative process continues at block 338 where the address stored in memory is output to the addressing circuits of the addressed target 30. The process continues at block 340 where internal (i.e., on board) address of the address circuit of the target 30 is compared to the address from the database. At decision block 342, the central processing unit 24 compares the database address to the target address. If the addresses do not correspond to each other, then the process waits at block 344 and returns to block 340. If the addresses correspond to each other, then the process continues to block 346 where the central processing unit 24 enables output signal circuitry of the address light emitter 60 of the addressed target 30. At block 348, the address light emitter 60 of the selected target 30 is turned on or illuminated. Next, at block 350, the user 18 through the NVG 14 searches for and locates the illuminated target 30. Once located, the user 18 then engages the illuminated target 30 at block 352 by directing the engagement signal 36 (e.g., light beam) to the light detectors 64a, 64b. Upon this occurring, the process continues at block 354 wherein the circuit receives the signal and transmits a response to the program of the central processing unit 24. More particularly, the trigger output 56 transmits a signal to the central processing unit 24.

The illustrative process continues at block 356 where the event time is stored in the database of the central processing unit 24. At block 358, the event time data is summed with other data in the database. Data may be output at block 360, illustratively to an output document at 362 for analysis by the user 18 or other operator. The process then concludes at block 364. Returning to block 354, then at block 366 if there are additional targets 30 to find, then the process returns to block 338. If there are no additional targets 30 to find, then the process proceeds to block 358.

Figure 20:
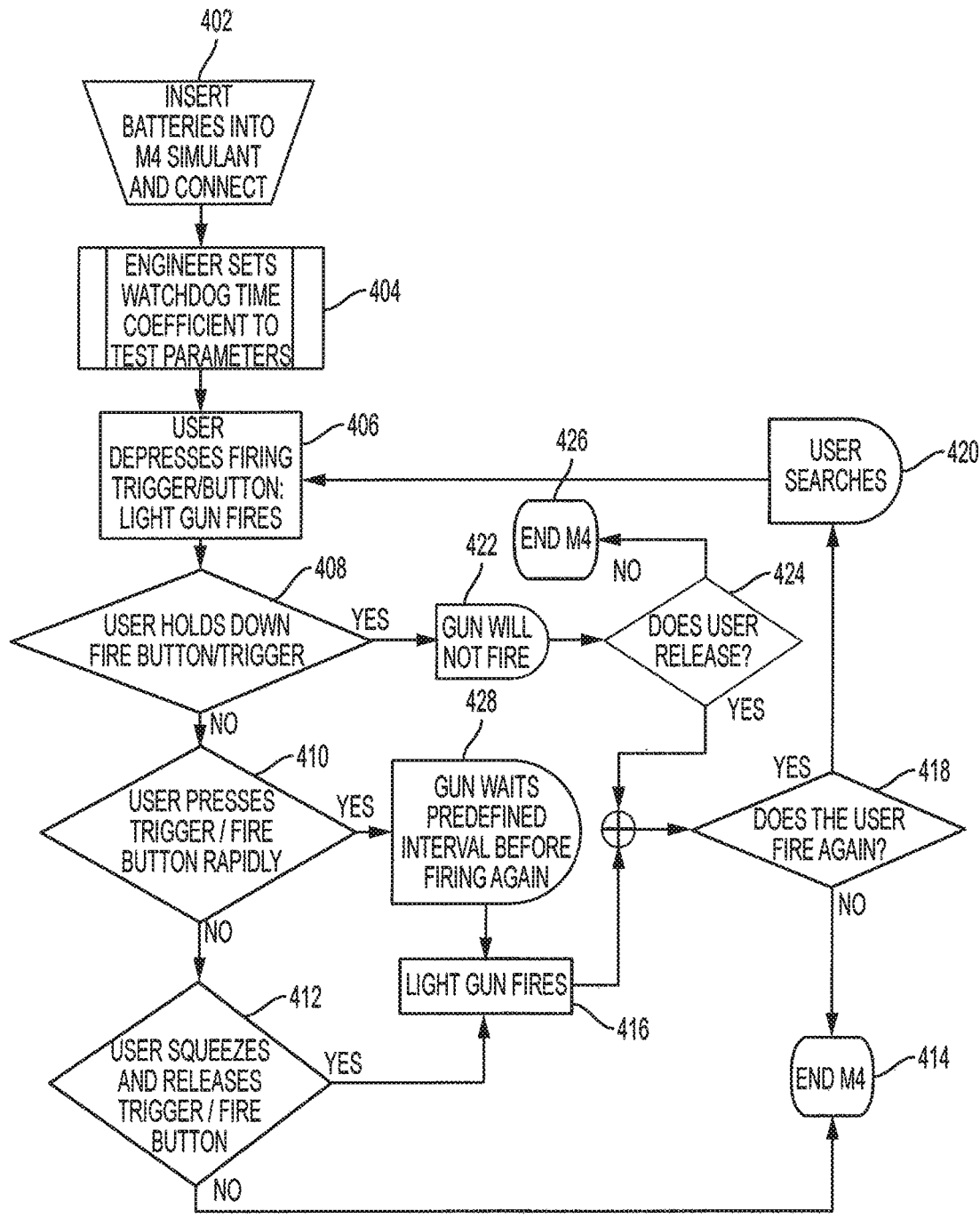
FIG. 20 is an illustrative operational flow chart of the user operated emitter of the response time evaluation system of FIG. 3.

FIG. 20 is an illustrative operational flow chart of the illuminating device of the response time evaluation system 20 of FIG. 3. The process illustratively begins at block 402 where the user 18 inserts batteries into the engagement signal source 72 of the user operated illuminator 34 and connects to the central processing unit 24, illustratively through a wireless connection 26. At block 404, the engineer or operator may set a watchdog time coefficient, for example, to simulate real world weapons fire timing. The watchdog time coefficient establishes a limit for the duration of time an engagement signal 36 is sent once a user holds down a firing button or trigger 78 to active the engagement signal source 72, along with a time delay between successive firing button depressions before subsequently activating the engagement signal source 34. At block 406, the user 18 depresses the firing trigger 78 and the engagement signal source 34 fires a predefined burst of light 36.

With further reference to FIG. 20, the illustrative process continues at decision block 408 where the central processing unit 24 inquires whether the user 18 holds down the firing trigger 78 for longer than a time period as predefined by the watchdog time coefficient. If no, then the process continues to decision block 410 where the central processing unit 24 inquires whether the user 18 presses the trigger 78 in rapid succession as predefined by the watchdog time coefficient. If no, then the process continues to decision block 412 where the central processing unit 24 determines whether the user 18 squeezes and releases the trigger 78. If no, then the process ends at block 414. If decision block 412 is answered in the affirmative, then the process continues at block 416 where the user operated illuminator 34 fires. More particularly, the engagement signal source 72 emits light beam 36.

Referring again to block 408, if it is determined that the user 18 is holding down or depressing the trigger 78 for more than the predetermined time period as defined by the watchdog time coefficient, then the process continues at block 422 where the user operated illuminator 34 will not activate. At decision block 424, the processor determines if the user 18 releases the trigger 78. If no, then the process ends at block 426. If yes, then the process continues to block 418.

Referring further to block 410, if it is determined that the user 18 is pressing the trigger 78 in rapid succession, then the process continues at block 428. At delay block 428, the user operated illuminator 34 waits for a predetermined interval before firing again. More particularly, the light source 72 will emit a light beam 36 followed by a delay. The process then continues at block 416.

Figure 21:
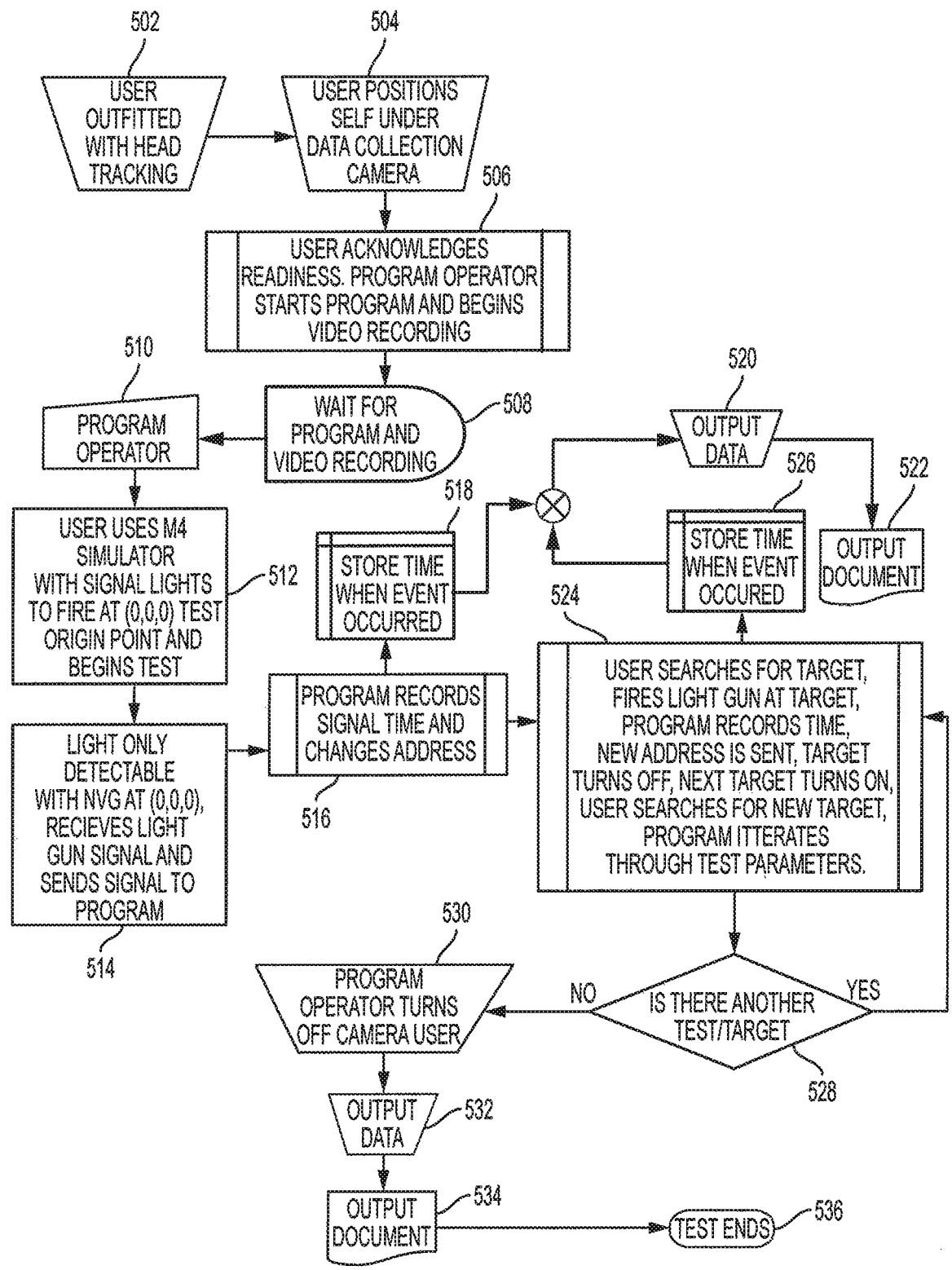
FIG. 21 is an illustrative operational flow chart of the scan angle tracking system of FIG. 3.

FIG. 21 is an illustrative operational flow chart of the scan angle tracking system 22 of FIG. 3. The process illustratively begins at block 502 where the user 18 is outfitted with the head tracking device, illustratively helmet 88 with head scan light emitters 82, 84, 86, along with the NVG 14. At block 504, the user 18 positions himself or herself proximate the data collection or head scan cameras 90, 92. More particularly, the head 16 of the user 18 is positioned below the head scan camera 90 and laterally adjacent the head scan camera 92. At process block 506, the user 18 acknowledges readiness for test initiation. The operator then starts the program and initiates video recording of cameras 90, 92. At block 508, the user 18 and the test administrator wait for the program and video recording to start. The program administrator then directs the user 18 to begin the test at block 510.

With further reference to FIG. 21, the illustrative process continues at block 512 where the user 18 holds the user operated engagement signal source 34 (e.g., the decoy M4 rifle or simulator) directed at an origin point to initiate the test. More particularly, at block 514 the central processing unit 24 activates the initiation target 30 by activating the respective address light emitter 60 to emit light only detectable through use of the NVG 14. At block 516, the program of the central processing unit 24 records the signal trigger time and changes the address in the manner detailed above. The process continues at block 518 where the trigger time is stored in the database. At block 520 the data is output, and output to a document at block 522.

Returning to block 516, the illustrative process may operate in parallel with block 518 at block 524. At block 524, the user searches for an illuminated target, fires the user operated engagement signal source 34 at the active target 30, the program in the central processing unit 24 records the trigger time, sends a new address to another target, deactivates the prior target, activates the new target, the user searches for the new active target, the program then continues to iterate through additional test parameters. The process continues in concurrent paths at block 526 and 528.

At decision block 528 of FIG. 21, if there is an additional test or target, then the process returns to block 524. If there are no additional tests or targets, then the process continues at block 530. At block 530, the program operator turns off the head scan cameras 90, 92, and the user 18 removes the helmet and head scan light emitters 82, 84, 86. At block 532 the data is output, and output to a document at block 534. The test then ends at block 536.

FIGS. 22A-22H are diagrammatic representations of an illustrative display 25a showing a two dimensional (2D) representation of the relative positioning of the head scan emitters 82 and 84, and light 36 emitted from the emitter 34 of the decoy weapon 70 as detected by the overhead camera 90. It should be appreciated that another illustrative display (not shown) may similarly show a two dimensional (2D) representation of the relative positioning of the head scan emitter 86, and light 35 emitted from the emitter 34 of the decoy weapon 70 as detected by the side camera 92. In yet another illustrative embodiment, a single display may provide a three dimensional (3D) representation integrating input from both the overhead camera 90 and the side camera 92.

Figure 22A:
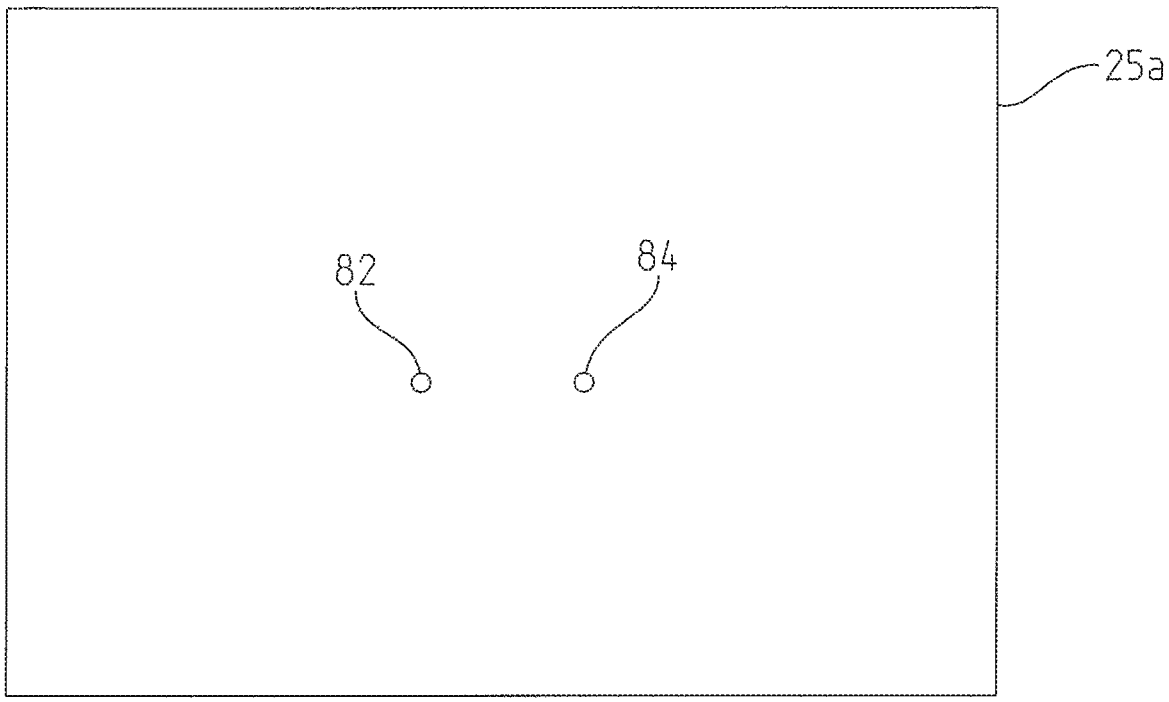
FIG. 22A is a diagrammatic view of an illustrative display, showing head scan markers in an initial position.
Figure 22B:
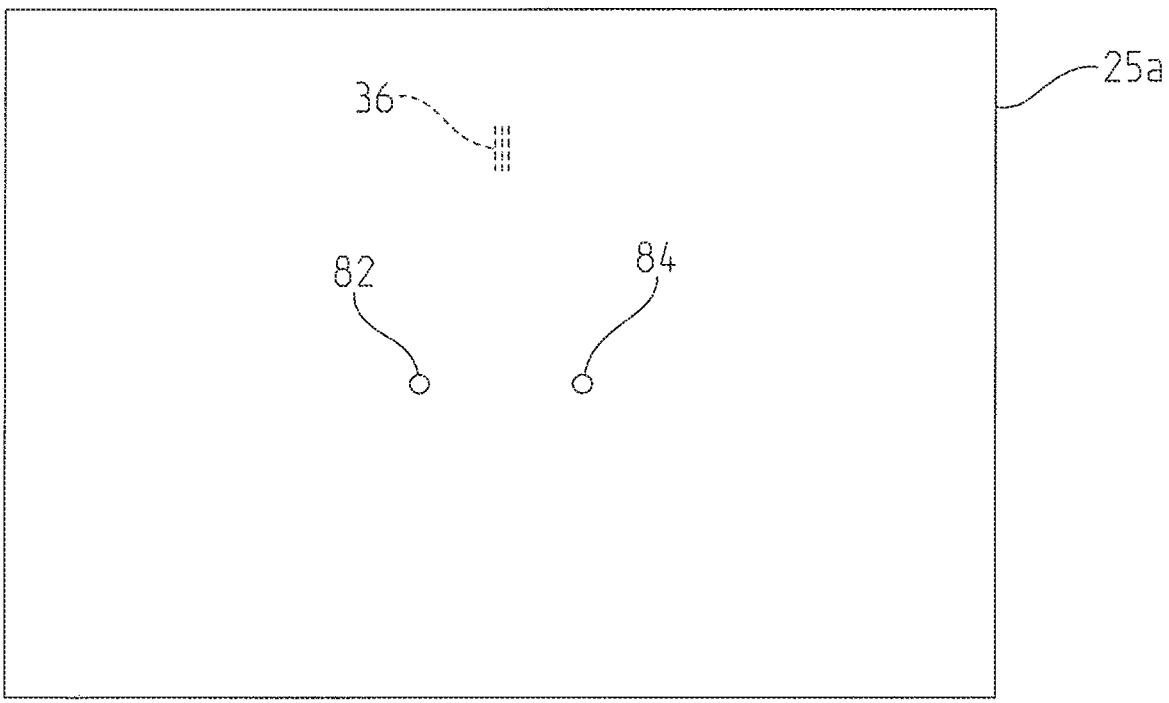
FIG. 22B is a diagrammatic view similar to FIG. 22A, further showing light emitted from the emitter of the decoy weapon.

FIG. 22A is a diagrammatic view of display 25a showing the head scan emitters 82 and 84 in a first or initialization position. FIG. 22B is a diagrammatic view of display 25a similar to FIG. 22A, showing light emitted from the emitter 34 of the decoy weapon 70 directed to an initial illuminated target 30, illustratively target 30bh which is assigned identifier (2,8).

Figure 22C:
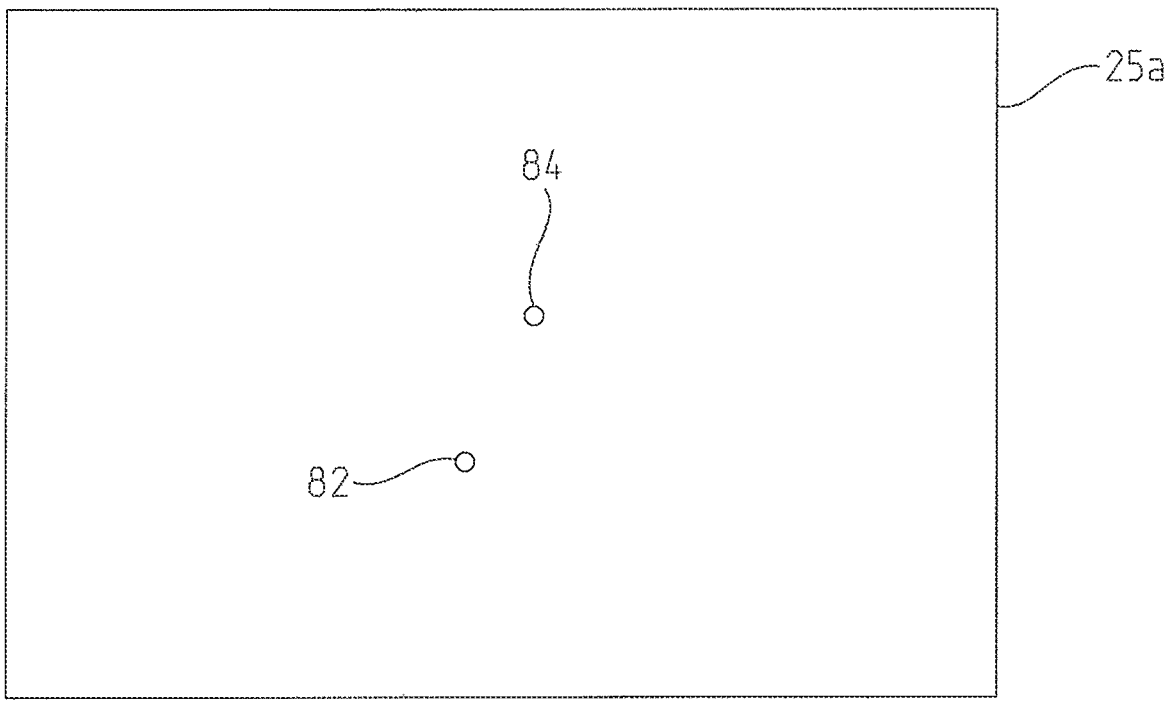
FIG. 22C is a diagrammatic view of the illustrative display, showing head scan markers in a first scanning position.
Figure 22D:
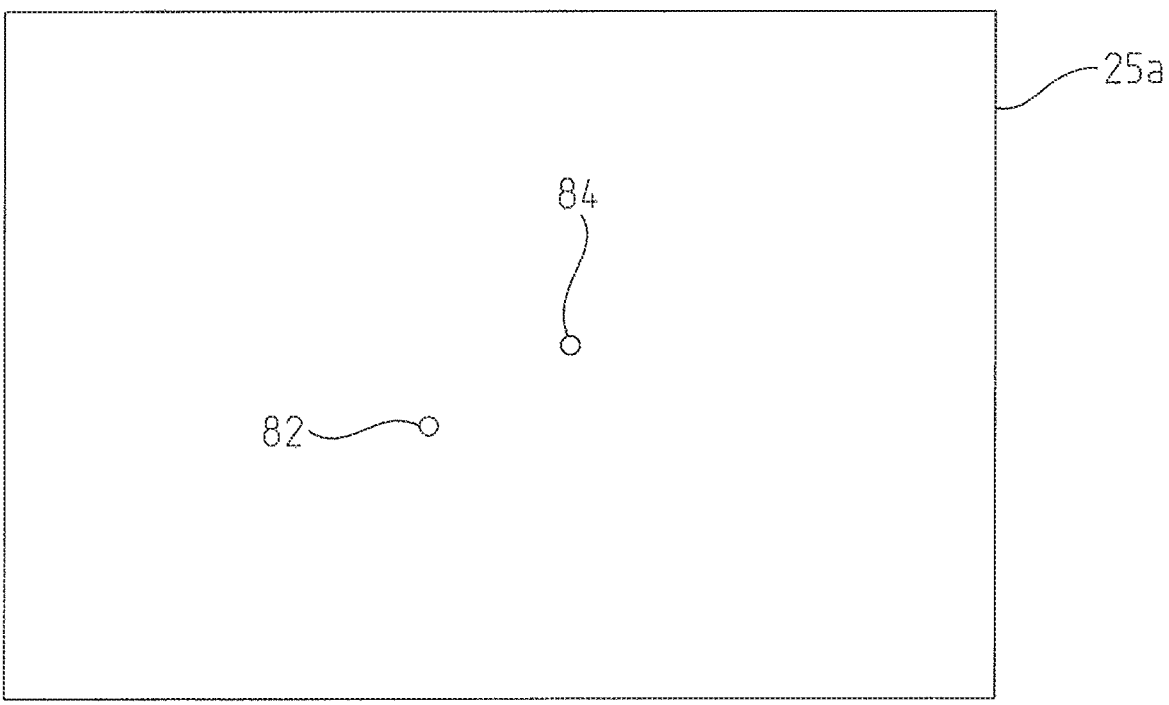
FIG. 22D is a diagrammatic view similar to FIG. 22C, showing head scan markers in a first identifying position.
Figure 22E:
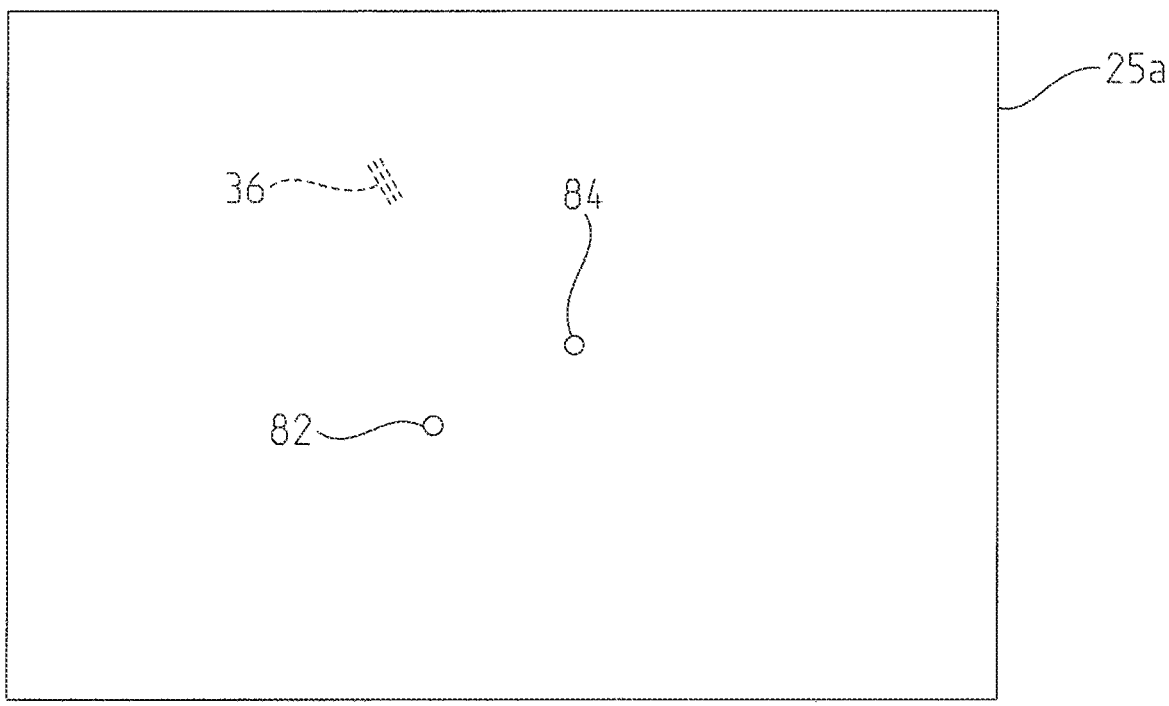
FIG. 22E is a diagrammatic view similar to FIG. 22D, further showing light emitted from the emitter of the decoy weapon.

FIG. 22C is a diagrammatic view of the illustrative display 25a, showing the head scan emitters 82 and 84 in a first scanning position. More particularly, the head 16 of the user 18 is rotated counterclockwise by approximately 65 degrees from the position of FIG. 22B, as the user 18 is attempting to locate the next or second illuminated target 30. FIG. 22D is a diagrammatic view of display 25a similar to FIG. 22C, showing the head scan emitters 82 and 84 in a first identifying position where the head 16 of the user 18 is rotated clockwise by approximately 35 degrees from the position of FIG. 22C, as the user 18 identifies the location of the second illuminated target 30, illustratively target 30bf which is assigned identifier (2,6). FIG. 22E is a diagrammatic view of display 25a similar to FIG. 22D, showing light 36 emitted from the emitter 34 of the decoy weapon 70, as the user 18 directs the light 36 toward the second illuminated target 30bf.

Figure 22F:
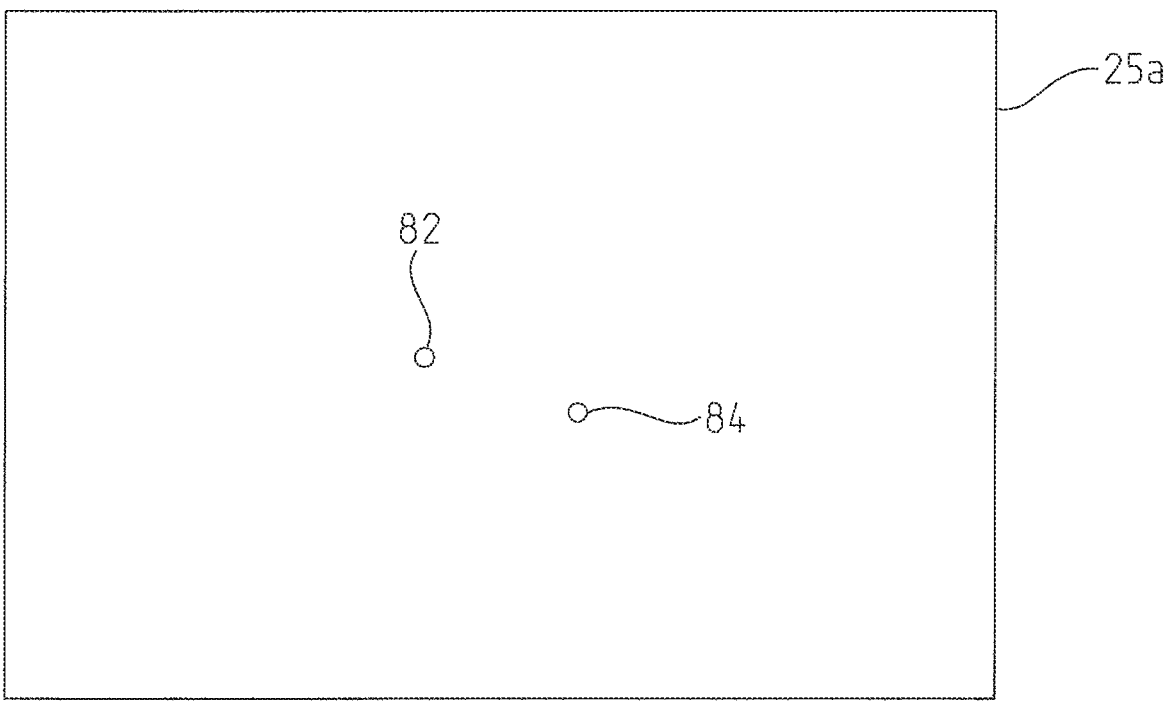
FIG. 22F is a diagrammatic view of the illustrative display, showing head scan markers in a second scanning position.
Figure 22G:
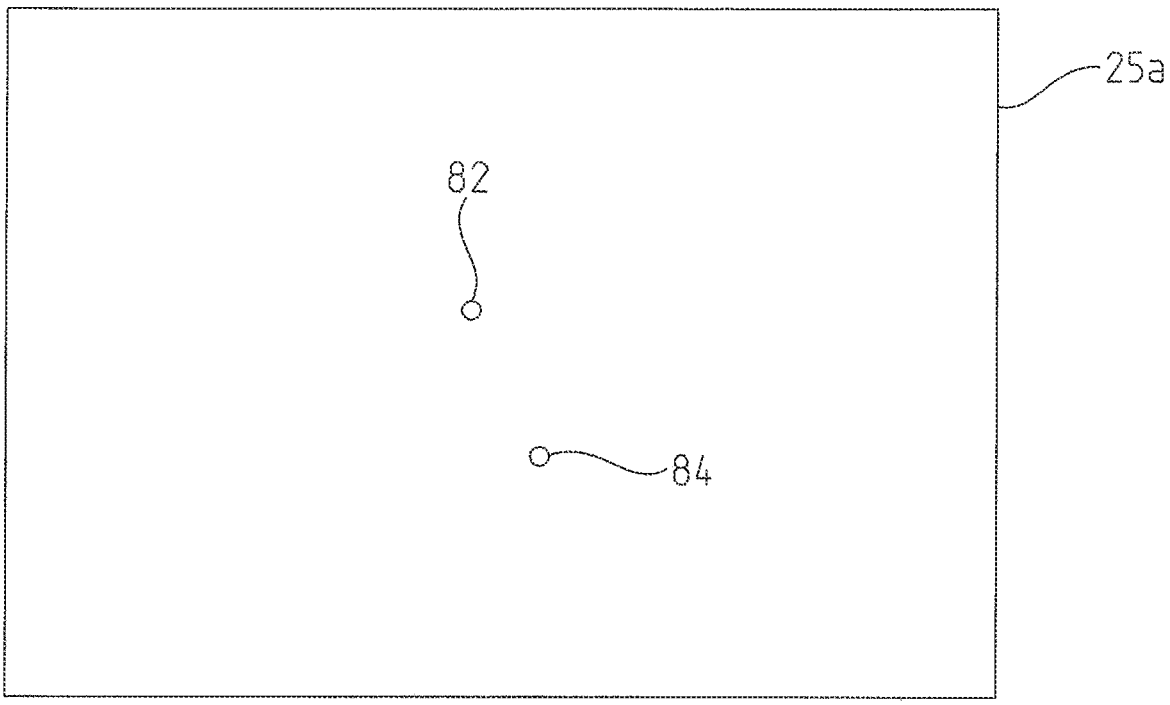
FIG. 22G is a diagrammatic view similar to FIG. 22F, showing head scan markers in a second identifying position.
Figure 22H:
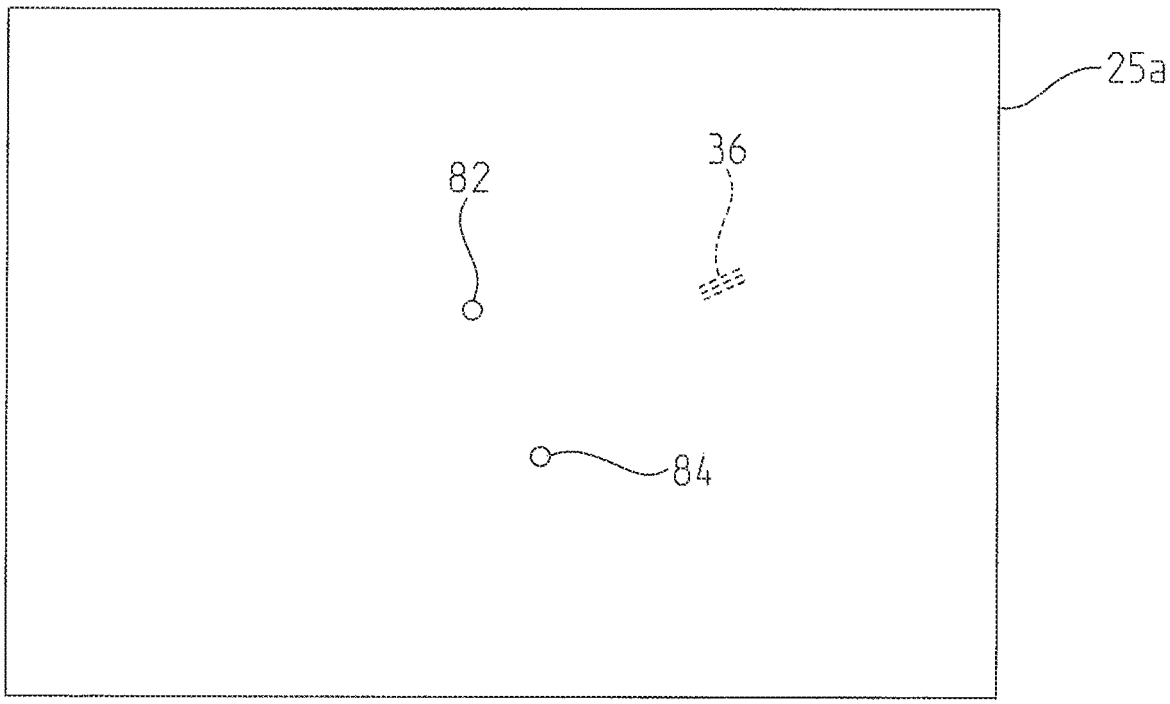
FIG. 22H is a diagrammatic view similar to FIG. 22F, further showing light emitted from the emitter of the decoy weapon.

FIG. 22F is a diagrammatic view of the illustrative display 25a, showing the head scan emitters 82 and 84 in a second scanning position. More particularly, the head 16 of the user 18 is rotated clockwise by 50 degrees from the position of FIG. 22E, as the user 18 is attempting to locate the next or third illuminated target 30. FIG. 22G is a diagrammatic view of display 25a similar to FIG. 22F, showing the head scan emitters 82 and 84 in a second identifying position where the head 16 of the user 18 is rotated clockwise by 45 degrees from the position of FIG. 22F, as the user 18 identifies the location of the third illuminated target 30, illustratively target 30bl which is assigned identifier (2,12). FIG. 22H is a diagrammatic view of display 25a similar to FIG. 22F, showing light 36 emitted from the emitter 34 of the decoy weapon 70, as the user 18 directs light 36 toward the third illuminated target 30bl. The testing session can continue for a predetermined time or for a predetermined number of illuminated targets 30 (e.g., for a total of 90 illuminated targets 30).

Figure 23:
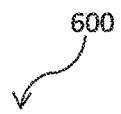
FIG. 23 is an illustrative table of data collected by the illustrative embodiment visual augmentation system effectiveness measurement apparatus of FIG. 1A.

FIG. 23 shows representative output data 600, in the form of an illustrative table of data collected by the exemplary embodiment visual augmentation system effectiveness measurement apparatus 10 of FIG. 1. As may be appreciated, this data may be output in a variety of manners, such as tables and graphs, in order to present the data in an efficient manner for interpretation and analysis. More particularly, the time at which a target 30 is triggered or illuminated and/or the time at which a target 30 is hit, along with head scan angles ($\alpha$, $\beta$) may provide input to the effectiveness of the NVG 14 worn by user 18. More particularly, this data may provide information regarding the figure of merit (FOM) of the image intensifier ($I^2$) tubes, resolution, and field of view (FOV) of the NVG 14. FOM is illustratively known as an abstract measure of image tube performance, derived from the number of line pairs per millimeter multiplied by the tube's signal-to-noise ratio.

As noted above, the illustrative embodiment visual augmentation system effectiveness measurement apparatus 10 may be used to quantitatively measure and compare differences in effectiveness between a user/machine with unaided vision and those equipped with various visual augmentation systems (VAS) with varying performance capabilities. Further, the illustrative embodiment visual augmentation system effectiveness measurement apparatus 10 may be used to quantitatively measure and compare differences in effectiveness between a user/machine equipped with a variety of different visual augmentation systems (VAS) with varying performance capabilities.

The illustrative embodiment visual augmentation system effectiveness measurement apparatus 10 may be used to compare unaugmented or unaided operation (e.g., without NVGs) to augmented or aided operation (e.g., with NVGs) utilizing, for example, the data detailed above and as represented in FIG. 23. The illustrative embodiment visual augmentation system effectiveness measurement apparatus 10 may also be used to compare different system configurations (e.g., different NVG configurations, mounts, etc.), thereby determining how different designs aid or hinder visual perception.

The illustrative visual augmentation system effectiveness measurement apparatus 10 may find use in training simulations with a wide variety of visual augmentation systems (VASs). For example, additional data may be collected by a user navigating an obstacle course in an unaided configuration (e.g., without a VAS) and/or in an aided configuration (e.g., with one or more different VASs).

Contrast and spatial frequency of different visual augmentation systems (VASs) may be measured by a user wearing the VAS who identifies the orientation and/or location of different patterns on a board at a predetermined distance from the user. Illustratively, the different patterns may include lines of varying thicknesses, distances and directions.

Additionally, by replacing the LED on the target with a light source emitting light of different wavelengths, other types of visual augmentation systems may be tested, such as short wave infrared (SWIR) imagers and thermal imagers.

The visual augmentation system effectiveness measurement apparatus 10 may also be used in an arcade type environment having NVGs. For example, the visual augmentation system effectiveness measurement apparatus 10 could be used in laser tag arenas.

The visual augmentation system effectiveness measurement apparatus 10 is configured to enable precision measurement of response time of user engagement with select targets, and can quantify the reduction in scan angle to detect and engage threats. More particularly, the visual augmentation system effectiveness measurement apparatus 10 is configured to quantify the time and angles to objectively measure performance of a user with and/or without the aid of a visual augmentation system (VAS) 12.

The illustrative visual augmentation system effectiveness measurement apparatus 10 may determine target scan efficiency and/or target engagement efficiency. Target scan efficiency is illustratively defined by how long it takes for user 18 to locate an active target 30. More particularly, the central processing unit 24 illustratively measures the time between activation (e.g., illumination) of the target 30 and location of the active target 30 as determined by the scan angle tracking system 22. Target engagement efficiency is illustratively defined by how long it takes for user 18 to engage the active target 30. More particularly, the central processing unit 24 illustratively measures the time between activation (e.g., illumination) of the target 30 and detection of the light beam 36 by the target 30.

Figure 24:
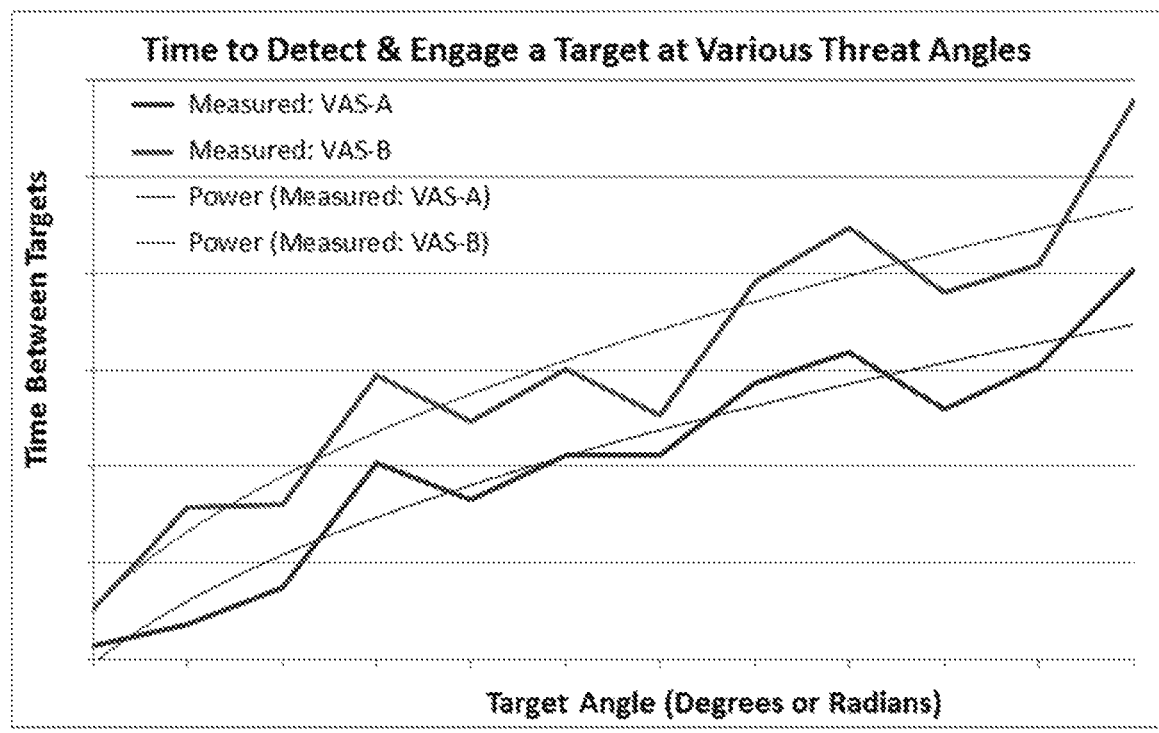
FIG. 24 is an illustrative graph of output data, showing time to detect and engage a target at various threat angles.

FIGS. 24-28 are illustrative graphs showing different representative output data from the visual augmentation system effectiveness measurement apparatus 10. More particularly, FIG. 24 is an illustrative graph of data collected by the illustrative embodiment visual augmentation system effectiveness measurement apparatus 10, showing the time to detect and engage a target 30 at various threat angles for different VAS configurations (e.g., VAS-A vs. VAS-B). More particularly, FIG. 24 illustrates the time for a user to engage a target 30 which appears at a specific angle using a particular VAS. As shown in the illustrative embodiment, VAS-A is able to engage targets 30 faster than VAS-B as a function of angle.

Figure 25:
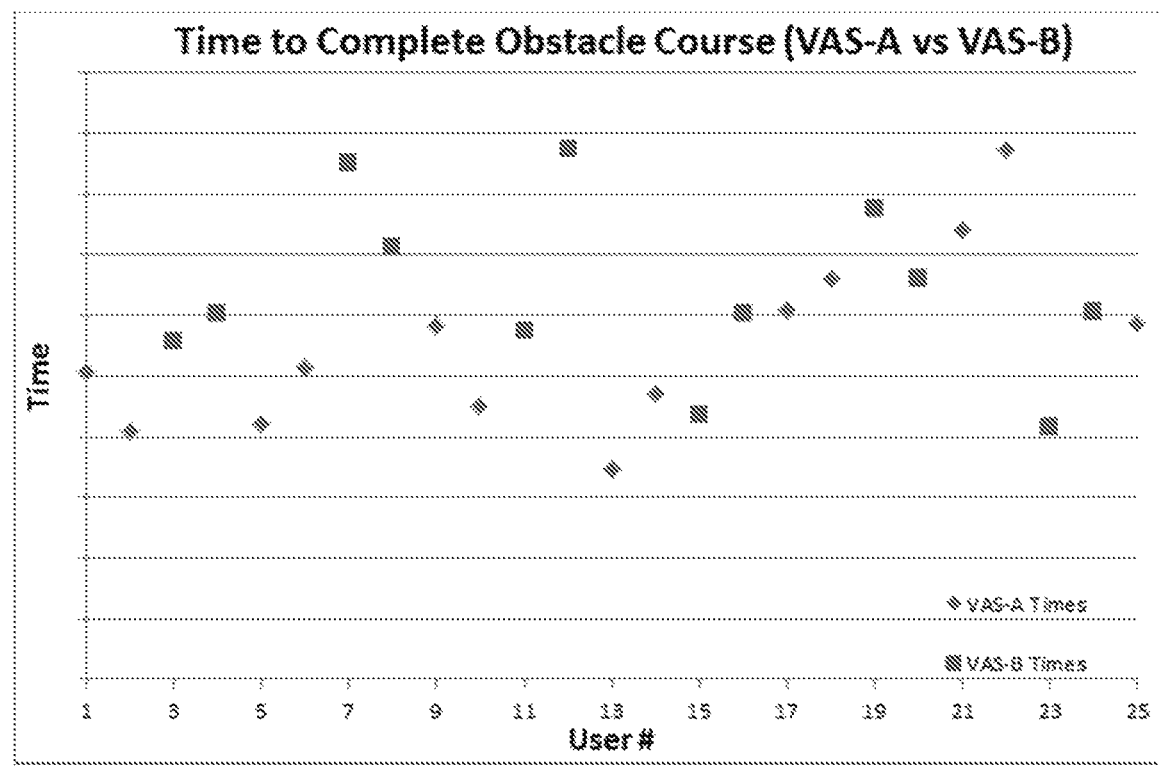
FIG. 25 is an illustrative graph of output data, showing time to complete an obstacle course.

FIG. 25 is an illustrative graph of output data, showing time to complete an obstacle course for different VAS configurations (e.g., VAS-A vs. VAS-B). More particularly, FIG. 25 illustrates the impact of a user navigating an obstacle course for the first time when either using VAS-A or VAS-B, and the times that each user group achieved.

Figure 26:
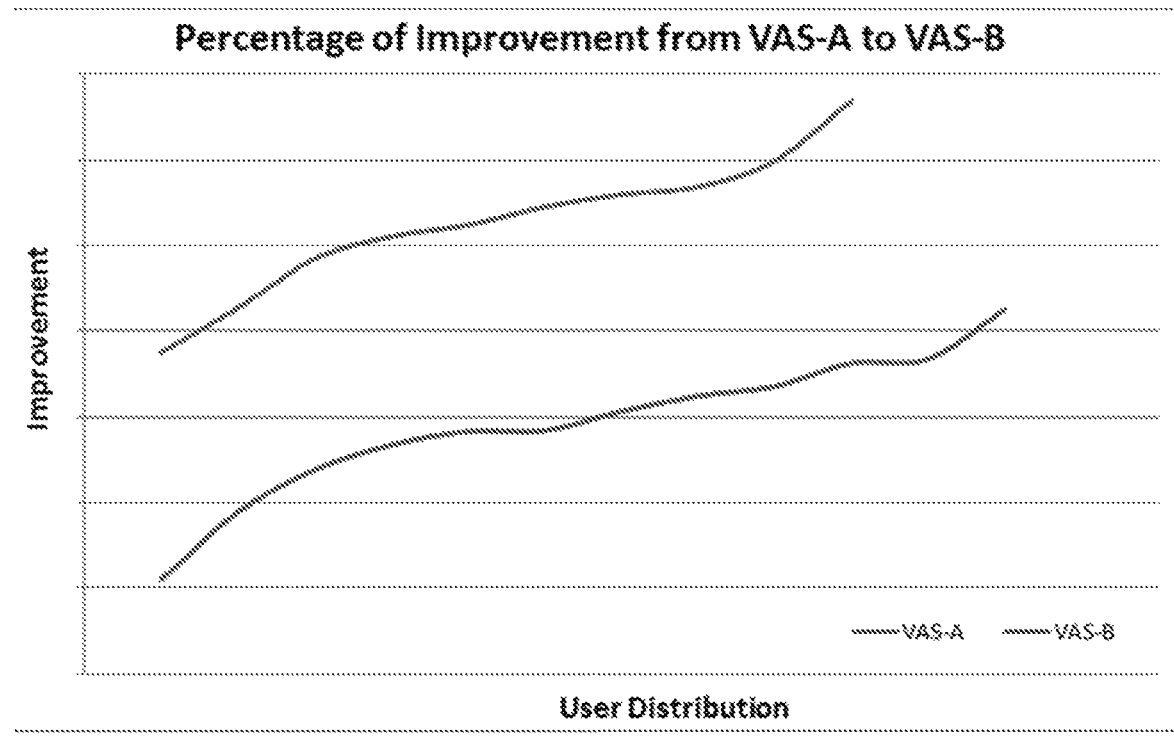
FIG. 26 is an illustrative graph of output data, showing percentage of improvement between different visual augmentation systems.

FIG. 26 is an illustrative graph of output data, showing percentage of improvement vs. improvement per user between different VAS configurations (e.g., VAS-A vs. VAS-B). More particularly, FIG. 26 illustrates the percentage of improvement a user experienced when switching from one visual augmentation system (VAS-A) to another visual augmentation system (VAS-B). In the illustrative embodiment of FIG. 26, users were faster (more efficient) when they moved from VAS-B to VAS-A, and were slower (less efficient) when they moved from VAS-A to VAS-B.

Figure 27:
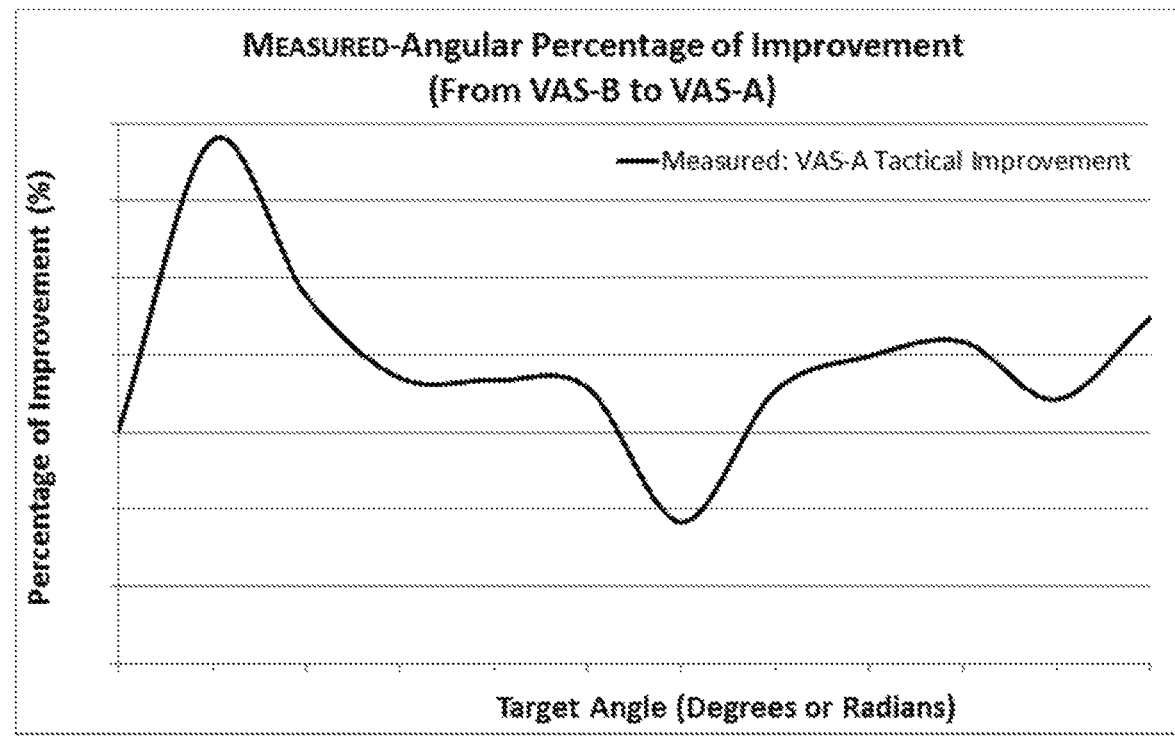
FIG. 27 is an illustrative graph of output data, showing a measured angular percentage of improvement between different visual augmentation systems.

FIG. 27 is an illustrative graph of output data, showing a measured angular percentage of improvement from different VAS configurations (e.g., VAS-A vs. VAS-B). More particularly, a percentage of improvement is compared to target angle. This is the averaged difference per unit of angle all users experienced when moving from one visual augmentation system (VAS-B) to another visual augmentation system (VAS-A).

Figure 28:
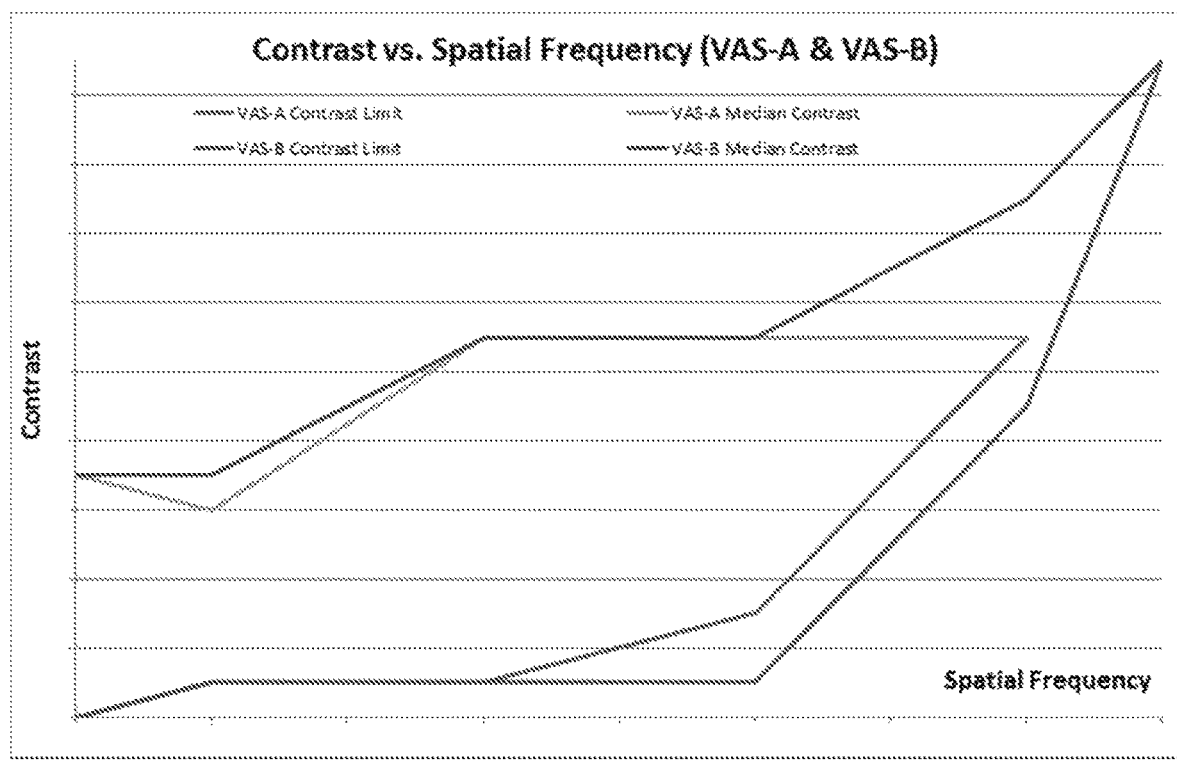
FIG. 28 is an illustrative graph of output data, showing contrast threshold function vs. spatial frequency when using different visual augmentation systems.

FIG. 28 is an illustrative graph of output data, showing contrast vs. spatial frequency for different VAS configurations (e.g., VAS-A vs. VAS-B). More particularly, FIG. 28 shows the average contrast threshold function vs. spatial frequency of a human when using VAS-A and VAS-B.

Although the invention has been described in detail with reference to certain preferred embodiments, variations and modifications exist within the spirit and scope of the invention as described and defined in the follow claims.

The invention claimed is:

1. A system for evaluating visual augmentation system effectiveness, the system comprising:
a visual augmentation system supported for movement by a rotatable support, the visual augmentation system configured to produce a visible image to a user in a plurality of selective spectrum and intensity lighting conditions;
a plurality of targets spaced apart from each other, each of the plurality of targets including a target radiation source configured to generate electromagnetic radiation visible to the user through the visual augmentation system, and a radiation detector for detecting an engagement signal, each of the targets having a unique target address;
a user operated emitter operably coupled to the rotatable support and configured to emit the engagement signal, the engagement signal defined by a beam of electromagnetic radiation; and
a controller in electrical communication with the plurality of targets, the controller including a library of the target addresses, an address control module configured to address one of the targets to define an addressed target, a trigger module to activate the target radiation source of the addressed target to define an active target, and a data acquisition module defining a hit target when the radiation detector of the addressed target detects the beam of radiation from the user operated emitter and to provide a time stamp upon detecting the hit target.

2. The system of claim 1, further comprising a scan angle tracking system in communication with the controller and including a scan marker supported for angular movement with the visual augmentation system, the scan angle tracking system configured to track angular movement of the scan marker.

3. The system of claim 2, wherein the controller stores a plurality of time stamps and tracked angular movements for the user with the visual augmentation system and without a visual augmentation system.

4. The system of claim 2, wherein the controller stores a plurality of time stamps and tracked angular movements for the user with a plurality of different visual augmentation system configurations.

5. The system of claim 2, wherein the scan marker of the scan angle tracking system includes a scan emitter for emitting electromagnetic radiation and supported by the rotatable support to detect electromagnetic radiation from the scan emitter and track angular movement of the visual augmentation system.

6. The system of claim 5, wherein the scan angle tracking system includes a first camera supported vertically above the scan emitter for tracking angular movement of the scan emitter in a horizontal plane.

7. The system of claim 6, wherein the scan angle tracking system includes a second camera supported horizontally adjacent to the scan emitter for tracking angular movement of the scan emitter in a vertical plane.

8. The system of claim 1, wherein the plurality of targets are circumferentially spaced in at least one arc.

9. The system of claim 8, wherein the plurality of targets are arranged in a plurality of vertically spaced rows, each row including a plurality of circumferentially spaced targets, such that the plurality of targets define at least a semispherical arrangement.

10. The system of claim 1, wherein each target includes an assigned address, the controller verifying the assigned address before activating the target radiation source.

11. The system of claim 1, wherein the rotatable support comprises one of a head of the user or an actuator driven positioning device.

12. The system of claim 11, wherein the actuator driven positioning device includes a ball joint gimbal.

13. The system of claim 1, further comprising a weapon supporting the user operated emitter.

14. The system of claim 1, wherein the user operated emitter is configured to emit radiation of various spectrums, intensities or optical magnifications.

15. The system of claim 14, wherein the user operated emitter is configured to emit visible light beam in pulses having a duration of less than 1 second each.

16. A system for evaluating visual augmentation system effectiveness, the system comprising:
a response time evaluation system including:
a plurality of targets spaced apart from each other, each of the plurality of targets including a target radiation source visible to the user through a visual augmentation system, and a radiation detector, each of the targets having a unique target address;
a user operated light emitter configured to be held by the user and emit a beam of light; and
a controller in electrical communication with the plurality of targets, the controller including a library of the target addresses, an address control module configured to address one of the targets and define an addressed target, a trigger module to activate the target radiation source of the addressed target and define an active target, and a data acquisition module defining a hit target when the radiation detector of the addressed target detects the beam of light from the user operated light emitter and to provide a time stamp upon detecting the hit target; and
a head scan angle tracking system in communication with the controller, the head scan angle tracking system including a head scan emitter for emitting electromagnetic radiation and supported by the head of the user, and a camera supported above the head scan emitter to detect electromagnetic radiation from the head scan emitter and track angular movement of the visual augmentation system.

17. The system of claim 16, wherein the head scan angle tracking system includes a first camera supported vertically above the head scan emitter for tracking angular movement of the head scan emitter in a horizontal plane.

18. The system of claim 17, wherein the head scan angle tracking system includes a second camera supported horizontally adjacent to the head scan emitter for tracking angular movement of the head scan emitter in a vertical plane.

19. The system of claim 16, wherein the plurality of targets are arranged in a plurality of vertically spaced rows, each row including a plurality of circumferentially spaced targets.

20. The system of claim 16, wherein each target includes an assigned address, the controller verifying the assigned address before activating the target light source.

21. The system of claim 16, wherein the user operated light emitter includes a user light source coupled to a weapon.

22. The system of claim 16, wherein the user operated light emitter is configured to emit visible light in pulses having a duration of less than one second each.

23. The system of claim 16, further comprising a visual augmentation system configured to be supported for movement by the head of a user, the visual augmentation system configured to produce a visible image to a user in a plurality of selective spectrum and intensity lighting conditions.

24. A system for evaluating visual augmentation system effectiveness, the system comprising:
  a visual augmentation system supported for movement by a rotatable support, the visual augmentation system configured to produce a visible image to a user in a plurality of selective spectrum and intensity lighting conditions;
  a plurality of targets spaced apart from each other, each of the plurality of targets including a target radiation source configured to generate electromagnetic radiation visible to the user through the visual augmentation system, and a radiation detector for detecting an engagement signal, each of the targets having a unique target address;
  a user operated emitter operably coupled to the rotatable support and configured to emit the engagement signal, the engagement signal defined by a visible light beam configured to simulate a muzzle flash from a weapon;
  a controller in electrical communication with the plurality of targets, the controller including a library of the target addresses, an address control module configured to address one of the targets to define an addressed target, a trigger module configured to activate the target radiation source of the addressed target to define an active target, the trigger module being further configured to control at least one of the wavelength, the intensity, and the divergence of the radiation emitted from the target radiation source, and a data acquisition module defining a hit target when the radiation detector of the addressed target detects the light beam from the user operated emitter and to provide a time stamp upon detecting the hit target; and
  a scan angle tracking system in communication with the controller, the scan angle tracking system configured to track rotational movement of the visual augmentation system.

25. The system of claim 24, wherein the scan angle tracking system includes a scan emitter supported by the rotatable support to track angular movement of the scan light source.

26. The system of claim 25, wherein the scan angle tracking system includes a first camera supported vertically above the scan emitter for tracking angular movement of the scan emitter in a horizontal plane.

27. The system of claim 26, wherein the scan angle tracking system includes a second camera supported horizontally adjacent to the scan emitter for tracking angular movement of the scan emitter in a vertical plane.

28. The system of claim 24, wherein the plurality of targets are circumferentially spaced in at least one arc.

29. The system of claim 28, wherein the plurality of targets are arranged in a plurality of vertically spaced rows, each row including a plurality of circumferentially spaced targets, such that the plurality of targets define at least a semi-spherical arrangement.

30. The system of claim 24, wherein each target includes an assigned address, the controller verifying the assigned address before activating the target radiation source.

31. The system of claim 24, wherein the rotatable support comprises one of a head of the user or an actuator driven positioning device.

32. The system of claim 31, wherein the actuator driven positioning device includes a ball joint gimbal.

33. The system of claim 24, further comprising a weapon supporting the user operated emitter.

34. The system of claim 24, wherein the user operated emitter is configured to emit radiation of various spectrums, intensities or optical magnifications.

35. The system of claim 34, wherein the user operated emitter is configured to emit visible light beam in pulses having a duration of less than 1 second each.

36. A system for evaluating visual augmentation system effectiveness, the system comprising:
  a visual augmentation system supported for movement by a rotatable support, the visual augmentation system configured to produce a visible image to a user in a plurality of selective spectrum and intensity lighting conditions;
  a plurality of targets spaced apart from each other, each of the plurality of targets including a target radiation source configured to generate electromagnetic radiation visible to the user through the visual augmentation system, and a radiation detector for detecting an engagement signal, each of the targets having a unique target address;
  a user operated emitter operably coupled to the rotatable support and configured to emit the engagement signal, the engagement signal defined by a beam of electromagnetic radiation;
  a controller in electrical communication with the plurality of targets, the controller including a library of the target addresses, an address control module configured to address one of the targets to define an addressed target, a trigger module to activate the target radiation source of the addressed target to define an active target, and a data acquisition module defining a hit target when the radiation detector of the addressed target detects the beam of radiation from the user operated emitter and to provide a time stamp upon detecting the hit target; and
  a scan angle tracking system in communication with the controller, the scan angle tracking system configured to track rotational movement of the visual augmentation system;
  wherein the scan angle tracking system includes:
    a scan emitter for emitting electromagnetic radiation and supported by the rotatable support to detect electromagnetic radiation from the head scan emitter and track angular movement of the visual augmentation system, a first camera supported vertically above the scan emitter for tracking angular movement of the scan emitter in a horizontal plane, and a second camera supported horizontally adjacent to the scan emitter for tracking angular movement of the scan emitter in a vertical plane.

37. A method of evaluating visual augmentation system effectiveness, the method comprising the steps of:

supporting a visual augmentation system on a head of a user for producing a visible image to the user in reduced light conditions;

providing a plurality of targets spaced apart from each other, each of the plurality of targets including a target radiation source visible to the user through the visual augmentation system, and a radiation detector, each of the targets having a unique target address;

providing a user operated emitter, the user operated emitter configured to be held by the user and emit a beam of radiation;

addressing one of the plurality of targets via the unique target address of the target, thereby defining an addressed target;

activating the target radiation source of the addressed target, thereby defining an illuminated target;

projecting the beam of radiation from the user operated emitter on the target;

detecting through the radiation detector the beam of radiation from the user operated emitter, thereby defining a hit target; and providing a data acquisition module for recording a time upon detecting the hit target.

38. The method of claim 37, further comprising the steps of:

supporting a scan light source on the head of the user; and tracking by a camera angular movement of the scan light source.

39. The method of claim 37, wherein the plurality of targets are arranged in a plurality of vertically spaced rows, each row including a plurality of circumferentially spaced targets.

40. The method of claim 37, wherein the user operated emitter includes a user light source coupled to a weapon.

41. The method of claim 37, wherein the step of projecting the beam of radiation includes emitting visible light in pulses having a duration of less than one second each.

* * * * *